US 11,884,407 B2

United States Patent
Sakamoto et al.

(10) Patent No.: US 11,884,407 B2
(45) Date of Patent: Jan. 30, 2024

(54) PARACHUTE DEVICE, FLIGHT DEVICE, AND FLYING BODY EJECTION MECHANISM

(71) Applicant: MINEBEA MITSUMI Inc., Nagano (JP)

(72) Inventors: Yuzuru Sakamoto, Fujisawa (JP); Shoji Shimohisa, Fujisawa (JP); Yoshihiro Mochida, Minamisouma (JP)

(73) Assignee: MINEBEA MITSUMI Inc., Nagano (JP)

( * ) Notice: Subject to any disclaimer, the term of this patent is extended or adjusted under 35 U.S.C. 154(b) by 214 days.

(21) Appl. No.: 17/594,879

(22) PCT Filed: Apr. 27, 2020

(86) PCT No.: PCT/JP2020/017975
§ 371 (c)(1),
(2) Date: Nov. 2, 2021

(87) PCT Pub. No.: WO2020/230614
PCT Pub. Date: Nov. 19, 2020

(65) Prior Publication Data
US 2022/0227495 A1    Jul. 21, 2022

(30) Foreign Application Priority Data
May 15, 2019    (JP) .................................. 2019-091904

(51) Int. Cl.
*B64D 17/80* (2006.01)
*B64D 17/72* (2006.01)
*B64U 70/83* (2023.01)

(52) U.S. Cl.
CPC ........... *B64D 17/80* (2013.01); *B64D 17/725* (2013.01); *B64U 70/83* (2023.01)

(58) Field of Classification Search
CPC ...... B64D 17/72; B64D 17/725; B64D 17/80; B64U 70/83; F16H 13/0006
See application file for complete search history.

(56) References Cited

U.S. PATENT DOCUMENTS

| 4,188,856 A | 2/1980 | Bendler et al. |
| 2016/0221681 A1* | 8/2016 | Babovka .............. B64C 39/024 |

(Continued)

FOREIGN PATENT DOCUMENTS

| JP | S53-144197 A | 12/1978 |
| JP | S58-118498 A | 7/1983 |

(Continued)

OTHER PUBLICATIONS

Notice of Reasons for Refusal dated May 9, 2022 for corresponding Japanese Application No. 2019-091904 and English translation.

(Continued)

*Primary Examiner* — Joshua J Michener
*Assistant Examiner* — Arfan Y. Sinaki
(74) *Attorney, Agent, or Firm* — Pearne & Gordon LLP

(57) ABSTRACT

A parachute device includes a parachute, a parachute accommodation section configured to accommodate the parachute, at least one flying body including a flying body main body section connected to the parachute, and a gas generating device configured to generate gas. The parachute device further includes an ejection section configured to eject the flying body, and a lead wire configured to ignite the gas generating device. The flying body main body section is engaged with the ejection section, the gas generating device is disposed in an internal space defined by the ejection section and the flying body main body section, and the lead wire is led out from the internal space in a different direction from an ejection direction of the flying body in a state with one end connected to the gas generating device.

16 Claims, 13 Drawing Sheets

(56) References Cited

U.S. PATENT DOCUMENTS

2016/0251083 A1    9/2016  Tsaliah et al.
2019/0016468 A1*   1/2019  Robertson .............. B64D 17/80
2020/0115049 A1*   4/2020  Nakamura ........... B64D 17/025

FOREIGN PATENT DOCUMENTS

| JP | 4785084 B2 | 10/2011 | | |
| JP | 2018-193055 A | 12/2018 | | |
| JP | 2018193055 A | * | 12/2018 | ............. F16H 25/06 |
| JP | 2019-014320 A | 1/2019 | | |

OTHER PUBLICATIONS

International Search Report for corresponding International Application No. PCT/JP2020/017975 dated Jun. 30, 2020.
Written Opinion for corresponding International Application No. PCT/JP2020/017975 dated Jun. 30, 2020.
International Preliminary Report on Patentability for corresponding International Application No. PCT/JP2020/017975 dated Nov. 16, 2021.

* cited by examiner

PARACHUTE DEVICE, FLIGHT DEVICE, AND FLYING BODY EJECTION MECHANISM

CROSS-REFERENCE TO RELATED APPLICATIONS

This application is a national stage of PCT/JP2020/017975, which claims the benefit of Japanese Application No. 2019-091904 filed on May 15, 2019, the entire disclosures of which are hereby incorporated herein by reference.

TECHNICAL FIELD

The present invention relates to a parachute device, a flight device, and a flying body ejection mechanism, and relates to, for example, a parachute device attached to a flight device being of the multi-rotor rotary wing aircraft type capable of remote control and autonomous flight.

BACKGROUND ART

In recent years, practical use of flight devices being of the multi-rotor rotary wing aircraft type capable of remote control and autonomous flight (hereinafter, also simply referred to as "rotary wing aircraft") in industrial fields has been considered. For example, in the transportation industry, transport of loads, transport of passengers, and the like by using a rotary wing aircraft (so-called drone) have been considered.

A rotary wing aircraft for transport has an autonomous flight function of flying while identifying an own position by global positioning system (GPS) signals or the like. However, when an abnormality occurs in the rotary wing aircraft due to some cause, there is a risk that autonomous flight may not be possible and an accident such as falling of the rotary wing aircraft may occur. Thus, improvement in safety of the rotary wing aircraft is desired.

In particular, it is expected that the body size of rotary wing aircraft for transport will increase so as to be able to transport larger loads and passengers. When such a large rotary wing aircraft is in an uncontrollable state and falls due to some cause, there is a risk of severe damage to people or structures compared to known rotary wing aircraft. Due to this, when the size of the rotary wing aircraft is increased, safety needs to be emphasized more than ever.

Thus, the inventors of the present application have investigated attaching a parachute device to a rotary wing aircraft in order to improve the safety of the rotary wing aircraft.

For example, Patent Document 1 discloses a parachute deployment device for a rotary wing aircraft having a structure where a plurality of projectiles are inserted and disposed through a hollow tube communicating with a container incorporating a gas generator, and each projectile and the parachute are connected by using cords. This parachute deployment device causes the parachute to be forcibly opened by generating gas from the gas generator and ejecting the projectiles from ejection stands when the rotary wing aircraft falls.

CITATION LIST

Patent Literature

Patent Document 1: US 2016/251,083 A

SUMMARY OF INVENTION

Technical Problem

However, in the parachute deployment device disclosed in Patent Document 1, the projectile (flying body) is only inserted through the hollow tube serving as the ejection stand, and a holding mechanism for fixing the projectile to the ejection stand is not specifically provided. Because of this, the projectile may move from an appropriate position, or the projectile may fall out of the hollow tube, for example, when the rotary wing aircraft equipped with the parachute deployment device is largely inclined, when the rotary wing aircraft is turned upside down, or the like, and thus, the projectile may not be properly ejected when necessary.

As a method for solving this problem, a method of fixing a projectile to a hollow tube by, for example, a shear pin being breakable at the time of ejection of the projectile is conceivable. However, this method requires processing for forming holes at the projectile and the ejection stand, and increases the number of components, so is not preferable.

The present invention has been made in view of the problem described above, and an object of the present invention is to prevent a flying body from falling out of a parachute device in a parachute device capable of ejecting a flying body and forcibly opening a parachute.

Solution to Problem

A parachute device according to a typical embodiment of the present invention includes a parachute, a parachute accommodation section configured to accommodate the parachute, at least one flying body including a flying body main body section connected to the parachute and a gas generating device configured to generate gas, an ejection section configured to hold the flying body and to eject the flying body held, and a lead wire configured to ignite the gas generating device, the flying body main body section is engaged with the ejection section, the gas generating device is disposed in an internal space defined by the ejection section and the flying body main body section, and the lead wire is led out from the internal space in a different direction from an ejection direction of the flying body in a state with one end connected to the gas generating device.

Advantageous Effects of Invention

According to one aspect of the present invention, in a parachute device capable of ejecting a flying body and forcibly opening a parachute, it is possible to prevent the flying body from falling out of the parachute device.

DESCRIPTION OF EMBODIMENTS

1. Overview of Embodiment

Figure 1:
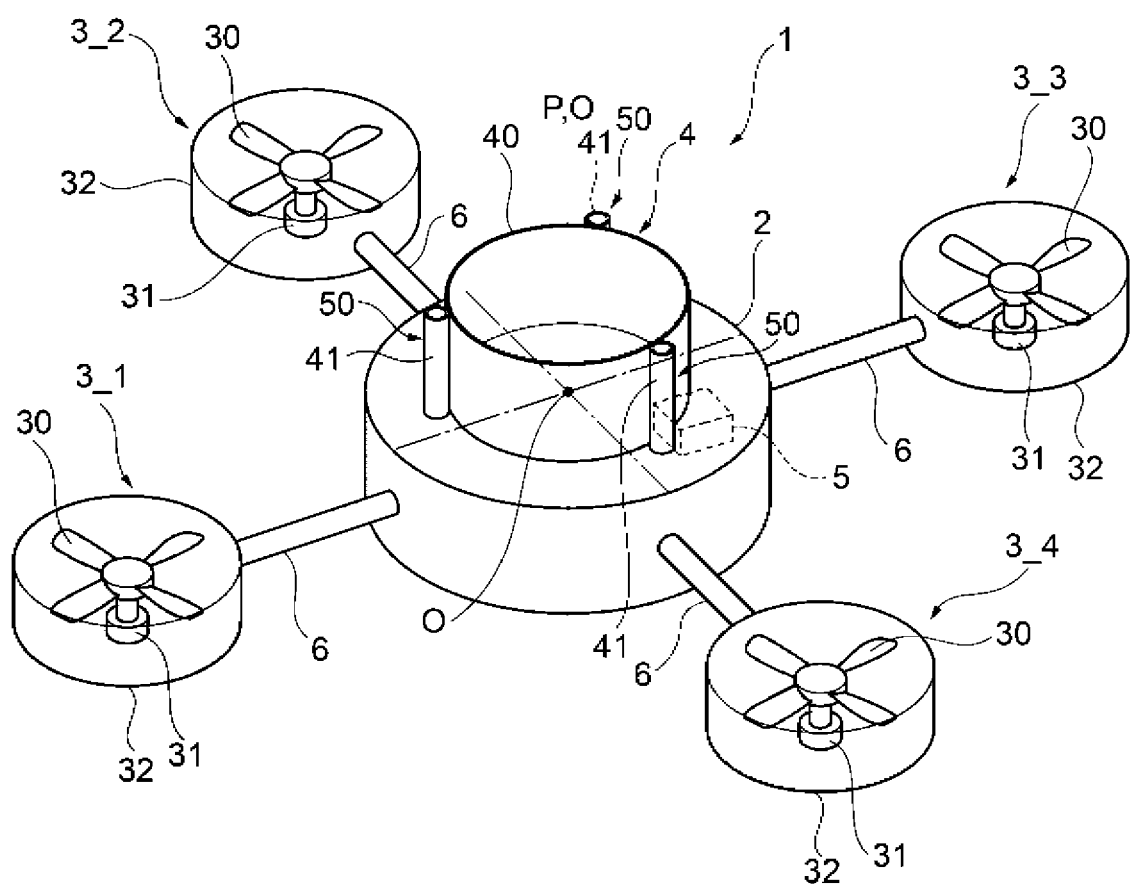
FIG. 1 is a diagram schematically illustrating an appearance of a flight device equipped with a parachute device according to Embodiment 1.

First, an overview of a typical embodiment of the invention disclosed in the present application will be described. Note that, in the following description, reference signs in the drawings corresponding to the constituent elements of the invention are mentioned in parentheses as an example.

[1] A parachute device (4, 4A to 4D) according to a typical embodiment of the present invention includes a parachute (400), a parachute accommodation section (40) configured to accommodate the parachute, at least one flying body (43) including a flying body main body section (44) connected to the parachute and a gas generating device (45) configured to generate gas, an ejection section (41) configured to hold the flying body and to eject the flying body held, and a lead wire (47) configured to ignite the gas generating device, the flying body main body section is engaged with the ejection section, the gas generating device is disposed in an internal space (440) defined by the ejection section and the flying body main body section, and the lead wire is led out from the internal space in a different direction from an ejection direction of the flying body in a state with one end connected to the gas generating device.

[2] In the parachute device (4, 4B) described above, the lead wire may be led out in a direction (S) opposite to the ejection direction.

[3] In the parachute device (4A, 4C) described above, the lead wire may be led out in a direction (R) intersecting with the ejection direction.

[4] In the parachute device (4) described above, the ejection section (41) may include a side wall portion (411) having a tube shape and a bottom portion (412) covering one opening of the side wall portion, the flying body main body section (44) may be formed in a bar shape, the gas generating device may be disposed at one end side of the flying body main body section, the flying body may be disposed at the ejection section such that the flying body main body section is inserted in an interior of the ejection section at the one end side and the gas generating device faces the bottom portion of the ejection section in the interior of the ejection section, the bottom portion may be formed with a through-hole (4120), and the lead wire may be led out through the through-hole to an exterior of the ejection section.

[5] In the parachute device (4A) described above, the ejection section (41A) may include a side wall portion (411A) having a tube shape and a bottom portion (412) covering one opening of the side wall portion, the flying body main body section (44A) may be formed in a bar shape, the gas generating device may be disposed at one end side of the flying body main body section, the flying body (43A) may be disposed at the ejection section such that the flying body main body section is inserted in an interior of the ejection section at the one end side and the gas generating device faces the bottom portion of the ejection section in the interior of the ejection section, the side wall portion may be formed with a through-hole (4110), and the lead wire may be led out through the through-hole to an exterior of the ejection section.

[6] In the parachute device (4B) described above, the ejection section (41B) may be formed in a bar shape, the flying body main body section may include a supporting section (443B) formed in a tube shape, and inserted with at least a part of the ejection section from one end side, a holding section (441B) configured to hold the gas generating device at an other end side of the supporting section such that the gas generating device faces a tip end portion (414B) of the ejection section into the supporting section, and a connection section (442B) formed so as to protrude from the holding section to a side opposite to the supporting section, and connected to a connection line (46) connecting the parachute and the flying body, and the lead wire may extend in a direction (S) opposite to the tip end portion in an interior of the ejection section.

[7] In the parachute device (4C) described above, the ejection section (41C) may be formed in a bar shape, the flying body main body section (44C) may include a supporting section (443C) formed in a tube shape, and inserted with at least a part of the ejection section from one end side, a holding section (441C) configured to hold the gas generating device at an other end side of the supporting section such that the gas generating device faces a tip end portion (414C) of the ejection section inserted into the supporting section, and a connection section (442C) formed so as to protrude from the holding section to a side opposite to the supporting section, and connected to a connection line (46) connecting the parachute and the flying body, the holding section may be formed with a through-hole (4412), and the lead wire may be led out through the through-hole to an exterior of the flying body main body section.

[8] In the parachute device (4, 4A to 4C) described above, the gas generating device (45) may include a housing (451), a gas generating agent (454) housed in the housing, and an ignition agent (453) formed at the one end of the lead wire and fixed in a state with at least a part covered by the gas generating agent.

[9] A flight device (1) according to a typical embodiment of the present invention includes an aircraft body unit (2), a thrust force generation section (3_1 to 3_n) connected to the aircraft body unit and configured to generate a thrust force, a flight control section (14) configured to control the thrust force generation section, an abnormality detection section (15) configured to detect an abnormality during flying, the parachute device (4) according to any one of [1] to [8] described above, and a fall control section (16) configured to cause the flying body to be ejected from the ejection section in response to detection of the abnormality by the abnormality detection section.

[10] A flying body ejection mechanism (50, 50A, 50B, 50C) according to a typical embodiment of the present invention includes at least one flying body (43) including a flying body main body section (44) capable of being connected to a parachute (400), and a gas generating device (45) configured to generate gas, an ejection section (41) configured to hold the flying body and to eject the flying body held, and a lead wire (47) configured to ignite the gas generating device, the flying body main body section is engaged with the ejection section, the gas generating device is disposed in an internal space defined by the ejection section and the flying body main body section, and the lead wire is led out from the internal space in a different direction from an ejection direction of the flying body in a state with one end connected to the gas generating device.

[11] In the flying body ejection mechanism (50, 50B) described above, the lead wire may be led out in a direction (S) opposite to the ejection direction.

[12] In the flying body ejection mechanism (50A, 50C), the lead wire may be led out in a direction intersecting with the ejection direction.

[13] In the flying body ejection mechanism (50) described above, the ejection section (41) may include a side wall portion (411) having a tube shape and a bottom portion (412) covering one opening of the side wall portion, the flying body main body section (44) may be formed in a bar shape, the gas generating device may be disposed at one end side of the flying body main body section, the flying body may be disposed at the ejection section such that the flying body main body section is inserted in an interior of the ejection section at the one end side and the gas generating device faces the bottom portion of the ejection section in the interior of the ejection section, the bottom portion may be formed with a through-hole (4120), and the lead wire may be led out through the through-hole to an exterior of the ejection section.

[14] In the flying body ejection mechanism (50A) described above, the ejection section (41A) may include a side wall portion (411A) having a tube shape and a bottom portion (412) covering one opening of the side wall portion, the flying body main body section (44A) may be formed in a bar shape, the gas generating device may be disposed at one end side of the flying body main body section, the flying body (43A) may be disposed at the ejection section such that the flying body main body section is inserted in an interior of the ejection section at the one end side and the gas generating device faces the bottom portion of the ejection section in the interior of the ejection section, the side wall portion may be formed with a through-hole (4110), and the lead wire may be led out through the through-hole to an exterior of the ejection section.

[15] In the flying body ejection mechanism (50B) described above, the ejection section (41B) may be formed in a bar shape, the flying body main body section may include a supporting section (443B) formed in a tube shape, and inserted with at least a part of the ejection section from one end side, a holding section (441B) configured to hold the gas generating device at an other end side of the supporting section such that the gas generating device faces a tip end portion (414B) of the ejection section into the supporting section, and a connection section (442B) formed so as to protrude from the holding section to a side opposite to the supporting section, and connected to a connection line (46) connecting the parachute and the flying body, and the lead wire may extend in a direction (S) opposite to the tip end portion in an interior of the ejection section.

[16] In the flying body ejection mechanism (50C) described above, the ejection section (41C) may be formed in a bar shape, the flying body main body section (44C) may include a supporting section (443C) formed in a tube shape, and inserted with at least a part of the ejection section from one end side, a holding section (441C) configured to hold the gas generating device at an other end side of the supporting section such that the gas generating device faces a tip end portion (414C) of the ejection section inserted into the supporting section, and a connection section (442C) formed so as to protrude from the holding section to a side opposite to the supporting section, and connected to a connection line (46) connecting the parachute and the flying body, the holding section may be formed with a through-hole (4412), and the lead wire may be led out through the through-hole to an exterior of the flying body main body section.

2. Specific Examples of Embodiment

Hereinafter, specific examples of the embodiments of the present invention will be described with reference to the accompanying drawings. Note that, in the following description, constituent elements common to each of the embodiments are denoted with the same reference signs and will not be described repeatedly. Furthermore, it should be noted that the drawings are schematic drawings and the dimensional relationships, proportions, and the like between elements in the drawings may differ from reality. Among the drawings, portions having mutually different dimensional relationships and proportions may be included.

Embodiment 1

FIG. 1 is a diagram schematically illustrating an appearance of a flight device equipped with a parachute device according to Embodiment 1. A flight device 1 illustrated in FIG. 1 is, for example, a flight device being of the multi-rotor rotary wing aircraft type equipped with three or more rotors, and is a so-called drone.

As illustrated in FIG. 1, the flight device 1 includes an aircraft body unit 2, thrust force generation sections 3_1 to 3_n (n being an integer equal to or greater than 3), a parachute device 4, a notification device 5, and arm sections 6.

The aircraft body unit 2 is a main body portion of the flight device 1. As will be described below, the aircraft body unit 2 accommodates various functional sections for controlling flying of the flight device 1. Note that in FIG. 1, the aircraft body unit 2 having a cylindrical shape is illustrated as an example, but a shape of the aircraft body unit 2 is not particularly limited.

The thrust force generation sections 3_1 to 3_n are rotors configured to generate a thrust force. Note that, in the following description, when each of the thrust force generation sections 3_1 to 3_n is not specifically distinguished, each of the thrust force generation sections is simply referred to as a "thrust force generation section 3". The number n of the thrust force generation sections 3 provided in the flight device 1 is not particularly limited, but is preferably three or more. For example, the flight device 1 may be any of a tricopter provided with three thrust force generation sections 3, a quadcopter provided with four thrust force generation sections 3, a hexacopter provided with six thrust force generation sections, and an octocopter provided with eight thrust force generation sections 3.

Note that in FIG. 1, a case of the flight device 1 being equipped with four (n=4) thrust force generation sections 3_1 to 3_4 and serving as a quadcopter is illustrated as an example.

The thrust force generation section 3 has, for example, a structure where a propeller 30, and a motor 31 configured to rotate the propeller 30, are accommodated in a case 32 having a tube shape. A net (for example, a resin material, a metal material (stainless steel, or the like), or the like) for preventing contact with the propeller 30 may be provided in an opening portion of the case 32 having the tube shape.

An arm section 6 has a structure for connecting the aircraft body unit 2 and each of the thrust force generation sections 3. The arm section 6 is formed so as to radially protrude from the aircraft body unit 2 with, for example, a central axis O of the aircraft body unit 2 as a center. Each of the thrust force generation sections 3 is attached respectively to a tip end of each of the arm sections 6.

The notification device 5 is a device for notifying the outside of the flight device 1 of danger. The notification device 5 is configured by including a light source formed of, for example, a light emitting diode (LED) or the like, or a sound generation device (an amplifier, a speaker, and the like). In response to detection of abnormalities by the abnormality detection section 15 to be described below, the notification device 5 notifies, by using light or sound, the outside of a dangerous state of the flight device 1.

Note that the notification device 5 may be exposed to the outside of the aircraft body unit 2, or may be accommodated in the interior of the aircraft body unit 2 in a form capable of outputting light generated from a light source, sound generated from a speaker, or the like to the outside.

The parachute device 4 is a device for slowing the falling speed of the flight device 1 and causing the flight device 1 to fall in a safe manner when an abnormality occurs in the flight device 1 and there is a risk of falling. As illustrated in FIG. 1, for example, the parachute device 4 is installed on the aircraft body unit 2. Note that the specific configuration of the parachute device 4 will be described later.

Figure 2:
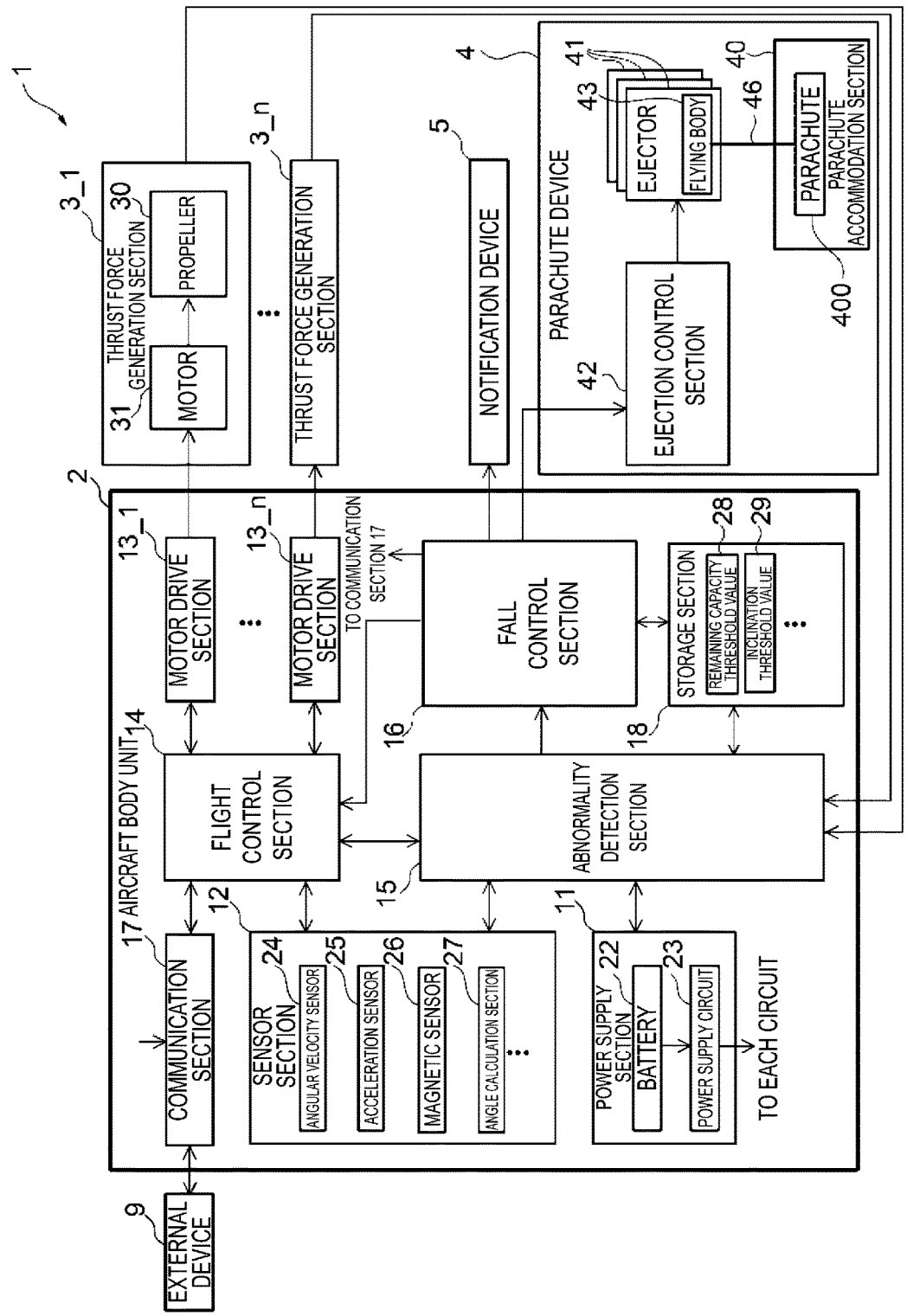
FIG. 2 is a functional block diagram of the flight device equipped with the parachute device according to Embodiment 1.

FIG. 2 is a functional block diagram of the flight device 1 equipped with the parachute device 4 according to Embodiment 1.

As illustrated in FIG. 2, the aircraft body unit 2 includes a power supply section 11, a sensor section 12, motor drive sections 13_1 to 13_n (n being an integer equal to or greater than 3), a flight control section 14, an abnormality detection section 15, a fall control section 16, a communication section 17, and a storage section 18.

Among these functional sections, the flight control section 14, the abnormality detection section 15, and the fall control section 16 are achieved by, for example, program processing by a program processing device (for example, a microcontroller) including a processor such as a central processing unit (CPU), and a memory.

The power supply section 11 includes a battery 22 and a power supply circuit 23. The battery 22 is, for example, a secondary battery (for example, a lithium-ion secondary battery). The power supply circuit 23 is a circuit configured to generate a power supply voltage based on an output voltage of the battery 22 to supply the power supply voltage to each hardware implementing the above-described functional sections. The power supply circuit 23 includes, for example, a plurality of regulator circuits, and supplies a power supply voltage having an appropriate magnitude for each hardware described above.

The sensor section 12 is a functional section for detecting a state of the flight device 1. The sensor section 12 detects an inclination of the aircraft body of the flight device 1. The sensor section 12 includes an angular velocity sensor 24, an acceleration sensor 25, a magnetic sensor 26, and an angle calculation section 27.

The angular velocity sensor 24 is a sensor for detecting an angular velocity (rotational velocity). For example, the angular velocity sensor 24 is a triaxial gyro sensor configured to detect an angular velocity based on three reference axes of an x-axis, a y-axis, and a z-axis.

The acceleration sensor 25 is a sensor for detecting an acceleration. For example, the acceleration sensor 25 is a triaxial acceleration sensor for detecting an acceleration based on three reference axes of the x-axis, the y-axis, and the z-axis.

The magnetic sensor 26 is a sensor for detecting terrestrial magnetism. For example, the magnetic sensor 26 is a triaxial geomagnetic sensor (electronic compass) for detecting an azimuth (absolute direction) based on three reference axes of the x-axis, the y-axis, and the z-axis.

The angle calculation section 27 calculates an inclination of the aircraft body of the flight device 1 based on a detection result of at least one of the angular velocity sensor 24 and the acceleration sensor 25. Here, the inclination of the aircraft body of the flight device 1 is an angle of the aircraft body (the aircraft body unit 2) with respect to the ground (horizontal direction).

For example, the angle calculation section 27 may calculate an angle of the aircraft body with respect to the ground based on a detection result of the angular velocity sensor 24, or may calculate an angle of the aircraft body with respect to the ground based on detection results of the angular velocity sensor 24 and the acceleration sensor 25. Note that, as a method of calculating an angle by using detection results of the angular velocity sensor 24 and the acceleration sensor 25, a known calculation equation may be used.

Additionally, the angle calculation section 27 may correct, based on a detection result of the magnetic sensor 26, the angle calculated based on the detection result of at least one of the angular velocity sensor 24 and the acceleration sensor 25. Similarly to the flight control section 14 or the like, for example, the angle calculation section 27 is achieved by program processing by a microcontroller.

Note that, in addition to the angular velocity sensor 24, the acceleration sensor 25, and the magnetic sensor 26 described above, the sensor section 12 may include, for example, an air pressure sensor, an air volume (wind direction) sensor, an ultrasonic sensor, a GPS receiver, a camera, and the like.

The communication section 17 is a functional section for communicating with an external device 9. Here, the external device 9 is a transmitter, a server, or the like configured to control an operation of the flight device 1 and to monitor a status of the flight device 1. The communication section 17 is configured by, for example, a radio frequency (RF) circuit and the like. Communication between the communication section 17 and the external device 9 is achieved, for example, by wireless communication in an ISM band (2.4 GHz band).

The communication section 17 receives operation information of the flight device 1 transmitted from the external device 9 to output the operation information to the flight control section 14, and transmits various measurement data and the like measured by the sensor section 12 to the external device 9. In addition, when an abnormality of the flight device 1 is detected by the abnormality detection section 15, the communication section 17 transmits, to the external device 9, information indicating that an abnormality has occurred in the flight device 1. Furthermore, the communication section 17 transmits, to the external device 9, information indicating that the flight device 1 has fallen when the flight device 1 falls to the ground.

The motor drive sections 13_1 to 13_n are provided for the respective thrust force generation sections 3_n, and are functional sections for driving the motors 31 to be driven in accordance with an instruction from the flight control section 14.

Note that, in the following description, when each of the motor drive sections 13_1 to 13_n is not specifically distinguished, each of the motor drive sections 13_1 to 13_n is simply referred to as a "motor drive section 13".

The motor drive section 13 drives the motor 31 such that the motor 31 rotates at the number of rotations instructed from the flight control section 14. For example, the motor drive section 13 is an electronic speed controller (ESC).

The flight control section 14 is a functional section for comprehensively controlling the respective functional sections of the flight device 1.

The flight control section 14 controls the thrust force generation sections 3 so that the flight device 1 stably flies. Specifically, the flight control section 14 calculates the appropriate number of rotations of the motor 31 of each thrust force generation section 3 so that the aircraft body stably flies in a desired direction, based on operation information received by the communication section 17 from the external device 9 (instructions for ascending, descending, advancing, retreating, and the like), and detection results of the sensor section 12, and instructs the calculated number of rotations to each motor drive section 13.

The flight control section 14 calculates the appropriate number of rotations of the motor 31 of each thrust force generation section 3 such that the aircraft body becomes horizontal, based on a detection result of the angular velocity sensor 24 when a posture of the aircraft body is disturbed, for example, due to an external influence such as wind, and instructs the calculated number of rotations to each motor drive section 13.

In addition, for example, the flight control section 14 calculates the appropriate number of rotations of the motor 31 of each thrust force generation section 3 based on a detection result of the acceleration sensor 25 in order to prevent drift of the flight device 1 during hovering of the flight device 1, and instructs the calculated number of rotations to each motor drive section 13.

Additionally, the flight control section 14 controls the communication section 17 to achieve transmission and reception of the various data described above to and from the external device 9.

The storage section 18 is a functional section for storing various programs, parameters, and the like for controlling operations of the flight device 1. For example, the storage section 18 is configured of a non-volatile memory such as a flash memory and a ROM, a RAM, and the like.

The above-described parameters stored in the storage section 18 are, for example, a remaining capacity threshold value 28, an inclination threshold value 29, and the like to be described below.

The abnormality detection section 15 is a functional section for detecting an abnormality during flying. Specifically, the abnormality detection section 15 monitors detection results of the sensor section 12, a state of the battery 22, and operation states of the thrust force generation sections 3, and determines whether the flight device 1 is in an abnormal state.

Here, the abnormal state refers to a state where autonomous flight of the flight device 1 may become impossible. For example, a state where at least one of a case where the thrust force generation section 3 has broken down, a case where a remaining capacity of the battery 22 has dropped below a predetermined threshold value, and a case where the aircraft body (the aircraft body unit 2) is abnormally inclined occurs is referred to as the abnormal state.

When the abnormality detection section 15 detects a failure of the thrust force generation section 3, the abnormality detection section 15 determines that the flight device 1 is in the abnormal state. Here, the "failure of the thrust force generation section 3" refers to, for example, a case where the motor 31 does not rotate at the number of rotations specified by the flight control section 14, a case where the propeller 30 does not rotate, a case where the propeller 30 has broken down, and the like.

In addition, when the abnormality detection section 15 detects that the remaining capacity of the battery 22 has dropped below a predetermined threshold value (hereinafter, also referred to as the "remaining capacity threshold value") 28, the abnormality detection section 15 determines that the flight device 1 is in the abnormal state.

Here, the remaining capacity threshold value 28 may be such a capacity value that the motor cannot rotate at the number of rotations instructed by the flight control section 14, for example. The remaining capacity threshold value 28 is stored in advance in the storage section 18, for example.

In addition, when the abnormality detection section 15 detects an abnormal inclination of the flight device 1 (aircraft body), the abnormality detection section 15 determines that the flight device 1 is abnormal. For example, the abnormality detection section 15 determines that the flight device 1 is in the abnormal state when a state where an angle calculated by the angle calculation section 27 exceeds a predetermined threshold value (hereinafter, also referred to as the "inclination threshold value") 29 continues for a predetermined period of time.

For example, an angle (pitch angle) of movement of the flight device 1 in a front and rear direction and an angle (roll angle) of movement of the flight device 1 in a left and right direction are obtained in advance by an experiment. The inclination threshold value 29 may be set to a value larger than the angle obtained by the experiment. The inclination threshold value 29 is stored in advance in the storage section 18, for example.

A fall control section 16 is a functional section for controlling falling of the flight device 1. Specifically, when the abnormality detection section 15 detects that the flight device 1 is in the abnormal state, the fall control section 16 performs fall preparation processing for causing the flight device 1 to fall in a safe manner.

Specifically, the fall control section 16 performs the following processing as the fall preparation processing. In other words, the fall control section 16 controls the notification device 5 in response to the detection of the abnormality by the abnormality detection section 15, and notifies the outside of a dangerous state. In addition, the fall control section 16 controls the respective motor drive sections 13 in response to the detection of the abnormality by the abnormality detection section 15 to stop the rotation of each motor 31. Furthermore, in response to the detection of the abnormality by the abnormality detection section 15, the fall control section 16 outputs a control signal indicating opening of a parachute to the parachute device 4 to open a parachute 400.

Next, the parachute device 4 according to Embodiment 1 will be described in detail.

Figure 3:
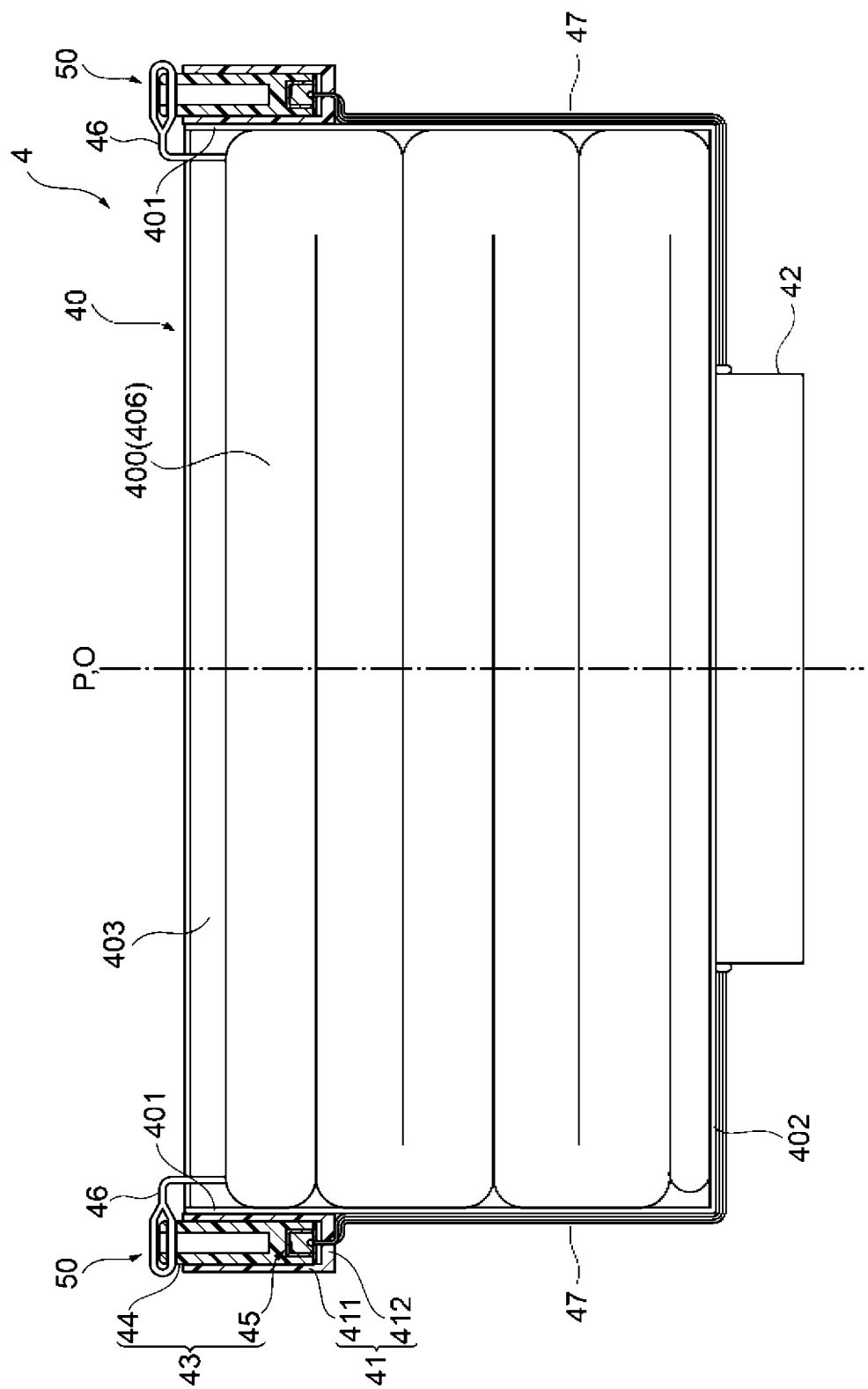
FIG. 3 is a diagram schematically illustrating a configuration of the parachute device according to Embodiment 1.

FIG. 3 is a diagram schematically illustrating a configuration of the parachute device 4 according to Embodiment 1. A side cross section of the parachute device 4 is illustrated in the same figure.

The parachute device 4 includes a parachute 400, a parachute accommodation section 40, ejection sections 41, an ejection control section 42, flying bodies 43, and lead wires 47.

Figure 4:
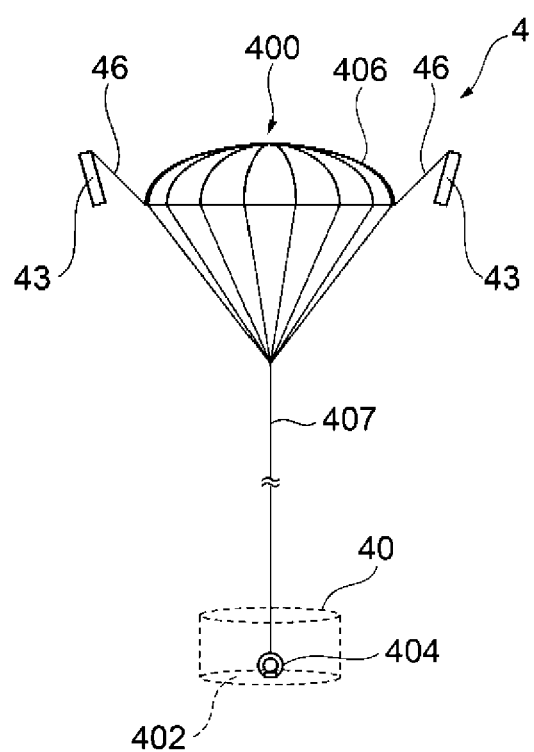
FIG. 4 is a diagram schematically illustrating a state with a parachute being open.

FIG. 4 is a diagram schematically illustrating a state with the parachute 400 being open.

As illustrated in the figure, the parachute 400 includes a parachute body (canopy) 406, and a hanging line 407.

The hanging line 407 connects the parachute body 406 and the parachute accommodation section 40 (a parachute attachment section 404).

The parachute body 406 is connected to the flying bodies 43 by the connection lines 46. For example, as illustrated in FIG. 4, the connection line 46 is connected to the parachute body 406 at an edge (peripheral edge) side from an apex of the parachute body 406. More specifically, the respective connection lines 46 are separated from one another, and are connected to a peripheral edge portion of the parachute 400. For example, as illustrated in FIG. 4, when the shape of the parachute 400 in a view from the apex side when the parachute 400 opens is circular, each connection line 46 is connected to the parachute 400 along the circumferential direction of the peripheral edge portion of the parachute 400 at equal intervals.

Note that when only one flying body 43 is provided, the connection line 46 may be connected at any one position of the peripheral edge portion of the parachute 400. In this case, positions at the peripheral edge portion of the parachute 400 connected with the connection lines 46 are not particularly limited.

The connection line 46 is formed of, for example, a metal material (for example, stainless steel) or a fiber material (for example, a nylon string).

For example, a diameter D of the parachute body 406 required to cause the flight device 1 to fall at a low speed can be calculated based on the following Equation (1). In Equation (1), m is a total weight of the flight device 1, v is a falling speed of the flight device 1, p is an air density, and Cd is a resistance coefficient.

[Equation 1]

$$D = \frac{2}{v}\sqrt{\frac{2mg}{p\pi \cdot Cd}} \quad (1)$$

For example, when the total weight of the flight device 1 is m=250 (kg), the resistance coefficient is Cd=0.9, and the air density p=1.3 kg/m, a diameter D of the parachute body 406 required to make the falling speed v of the flight device 1 be 5 (m/s) is calculated to be 14.6 (m) from Equation (1).

For example, as illustrated in FIG. 3, the parachute 400 is accommodated in the parachute accommodation section 40 with the parachute body 406 folded before its use.

The parachute accommodation section 40 is a container configured to accommodate the parachute 400. The parachute accommodation section 40 is configured of, for example, resin. As illustrated in FIG. 1, the parachute accommodation section 40 is set on an upper surface of the aircraft body unit 2, that is, on a surface facing an opposite side to the ground during flying of the flight device 1. For example, the parachute accommodation section 40 is preferably installed such that the central axis O of the aircraft body unit 2 and a central axis P of the parachute accommodation section 40 overlap with each other on the upper surface of the aircraft body unit.

As illustrated in FIG. 3, the parachute accommodation section 40 has, for example, a cylindrical shape having an opening at one end and having a bottom at the other end.

Specifically, the parachute accommodation section 40 includes a side wall portion 401 having a tube shape (for example, a cylindrical shape) and a bottom portion 402 formed so as to close an opening at one end side of the side wall portion 401.

In the parachute accommodation section 40, the side wall portion 401 and the bottom portion 402 define an accommodation space 403 for accommodating the parachute 400. Note that the side wall portion 401 and the bottom portion 402 may be individually formed and then joined, or may be integrally formed.

As illustrated in FIG. 4, the bottom portion 402 is provided with the parachute attachment section 404 for connecting the parachute accommodation section 40 and the parachute 400. For example, by connecting one end of the hanging line 407 of the parachute 400 to the parachute attachment section 404, the parachute 400 and the parachute accommodation section 40 are connected.

Note that the parachute accommodation section 40 may be provided with a lid covering the opened one end side of the side wall portion 401 in a state with the parachute 400 accommodated in the accommodation space 403.

The flying body 43 is a device configured to discharge the parachute 400 to the outside of the parachute accommodation section 40 to assist the opening (deployment) of the parachute 400. The flying body 43 has the gas generating device 45 configured to generate gas.

The lead wire 47 is an electrical wire for igniting the gas generating device 45. The lead wire 47 is configured of, for example, a vinyl wire, a tin-plated wire, an enamel wire, or the like. One end of the lead wire 47 is connected to the gas generating device 45, and the other end of the lead wire 47 is connected to the ejection control section 42.

The ejection control section 42 ignites the gas generating device 45 via the lead wire 47 to generate gas from the gas generating device 45. The flying body 43 obtains a thrust force by jetting the gas generated from the gas generating device 45 and is ejected from the ejection section 41.

The parachute device 4 includes at least one flying body 43. For example, the parachute device 4 preferably includes three or more flying bodies 43. In the present embodiment, as an example, a case of the parachute device 4 including three flying bodies will be exemplified and described. Note that a specific configuration of the flying body 43 will be described below.

The ejection section 41 is a device configured to hold the flying body 43 to eject the held flying body 43. The ejection section 41 is provided for each flying body 43. As illustrated in FIG. 1, the parachute device 4 according to Embodiment 1 includes three ejection sections 41 for separately accommodating three flying bodies 43.

The ejection control section 42 is a functional section configured to perform control for ejecting the flying body 43 from the ejection section 41. The ejection control section 42 is an electronic circuit configured to output an ignition signal when a control signal indicating the opening of the parachute 400 is output from the fall control section 16, for example. The ignition signal is input to the gas generating section 45 provided in each flying body 43 via the lead wire 47, and then, the ignition agent 453 to be described later is ignited to generate gas from the gas generating device 45.

Figure 5:
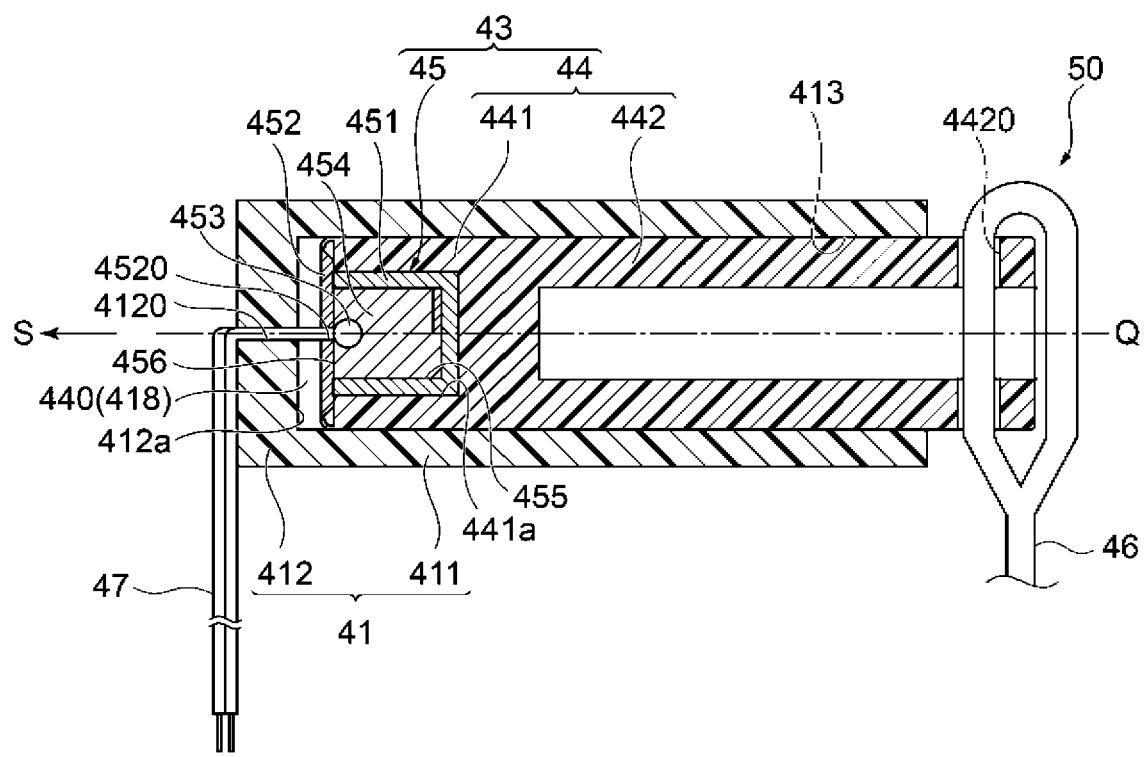
FIG. 5 is a diagram illustrating a configuration of a flying body ejection mechanism according to Embodiment 1.

FIG. 5 is a diagram illustrating a configuration of a flying body ejection mechanism according to Embodiment 1.

In the same figure, a cross-sectional shape of the flying body ejection mechanism 50 including the flying body 43, the ejection section 41, and the lead wire 47 is illustrated.

As illustrated in FIG. 5, the ejection section 41 is formed in a tube shape having an opening at one end and having a bottom at the other end. Specifically, the ejection section 41 includes, for example, a side wall portion 411 having a tube shape (for example, a cylindrical shape) and a bottom portion 412 covering one opening of the side wall portion 411. The side wall portion 411 and the bottom portion 412 define an accommodation space for accommodating the flying body 43. The side wall portion 411 and the bottom portion 412 are formed of, for example, resin. A through-hole 4120 for leading out the lead wire 47 to an exterior of the ejection section 41 is formed at the bottom portion 412.

The ejection section 41 is provided in the parachute accommodation section 40. For example, as illustrated in FIG. 1 and the like, each ejection section 41 is joined to an outer peripheral surface of the parachute accommodation section 40 such that an ejection port 413 being an opening portion at an opposite side to the bottom portion 412 in the side wall portion 411 faces the same direction as that of an opening portion of the parachute accommodation section 40.

Further, a plurality of ejection sections 41 are disposed at equal intervals in a rotational direction with the central axis P of the parachute accommodation section 40 as a center. For example, when the numbers of the flying bodies 43 and the ejection sections 41 are three as in Embodiment 1, the plurality of ejection sections 41 are arranged at 120° (=360°/3) intervals in the rotational direction with the central axis P of the parachute accommodation section 40 as a center.

Note that when only one ejection section 41 is provided, it is sufficient that the ejection section 41 be joined at any one position of the outer peripheral surface of the parachute accommodation section 40. In this case, a position on the outer peripheral surface of the parachute accommodation section 40 joined with the ejection section 41 is not particularly limited.

The flying body 43 includes the gas generating device 45 and the flying body main body section 44. As illustrated in FIG. 5, the flying body 43 is disposed at the ejection section 41 such that the flying body main body section 44 is inserted in an interior of the ejection section 41 at one end side, and the gas generating device 45 faces the bottom portion 412 (a bottom surface 412a) of the ejection section 41 in the interior of the ejection section 41.

The gas generating device 45 is a device configured to generate gas serving as a base of a thrust force for ejecting the flying body 43 from the ejection port 413 of the ejection section 41. As illustrated in FIG. 5, for example, the gas generating device 45 includes a housing 451, a sealing member 452, an ignition agent 453, and a gas generating agent 454.

The housing 451 is a housing including a gas discharge chamber 455 configured to house the gas generating device 45 and to discharge the gas generated from the gas generating device 45. For example, the housing 451 has a dome shape. The housing 451 is configured of, for example, resin. Preferably, the housing 451 is configured of fiber-reinforced plastics (FRP) or the like. Note that the housing 451 is not limited to being made of resin, and may be configured of metal.

As illustrated in FIG. 5, the gas discharge chamber 455 is filled with the gas generating agent 454.

The ignition agent 453 is a chemical agent for igniting the gas generating agent. The ignition agent 453 is formed at one end of the lead wire 47. For example, the ignition agent 453 can be fixed to one end of the lead wire 47 by applying and solidifying a liquid ignition agent mixed with resin or the like to the tip end of the lead wire 47.

Note that in FIG. 5, a case of the ignition agent 453 having a spherical shape is exemplified, but the shape of the ignition agent 453 is not particularly limited.

The ignition agent 453 is fixed in a state with at least a part covered with the gas generating agent 454. For example, as illustrated in FIG. 5, the ignition agent 453 is fixed, in the housing 451, in an embedded manner in the gas generating agent 454. The method of fixing the ignition agent 453 is, for example, as follows.

First, the powdery gas generating agent 454 mixed with resin or the like is loaded into the gas discharge chamber 455 of the housing 451. After that, in a state where the ignition agent 453 formed at the tip end of the lead wire 47 is included in the powdery gas generating agent 454, the gas generating agent 454 is subjected to pressed loading. As a result, the ignition agent 453 is fixed inside the gas generating agent 454, and one end of the lead wire 47 is connected to the gas generating device 45.

The ignition agent 453 is electrically connected to the ejection control section 42 via the lead wire (conductive wire) 47. The ignition agent 453 is ignited in response to an ignition signal output from the ejection control section 42, and the gas generating agent 454 is caused to chemically react to generate gas.

A gas discharge hole 456 for discharging gas generated from the gas generating agent 454 is formed in the gas discharge chamber 455. In addition, the gas discharge chamber 455 is provided with the sealing member 452 covering the gas discharge hole 456 to seal the gas generating agent 454 in the gas discharge chamber 455.

The sealing member 452 is configured of a material, when gas is generated from the gas generating agent 454, to be easily destroyed by a pressure of the generated gas. For example, the sealing member 452 is a thin film such as polyester. A through-hole 4520 for leading out the lead wire 47 to an exterior of the ejection section 41 is formed at the sealing member 452.

The gas generating device 45 is disposed in an internal space 440 defined by the ejection section 41 and the flying body main body section 44.

The flying body main body section 44 is a component to be connected to a parachute. The flying body main body section 44 is configured to hold the gas generating device 45 and is connected to the connection line 46. The flying body main body section 44 is formed, for example, in a bar shape. More specifically, the flying body main body section 44 is formed in a partially hollow cylindrical shape, for example. The flying body main body section 44 is engaged with the ejection section 41.

The flying body main body section 44 has the gas generating device 45 at one end, and is connected to the connection line 46 at the other end. In other words, the flying body main body section 44 is separated into two functional sections of a holding section 441 configured to hold the gas generating device 45 in the axis Q direction of the flying body main body section 44, and a connection section 442 for connecting with the connection line 46. For example, each of the holding section 441 and the connection section 442 has a tube shape having a bottom. The holding section 441 and the connection section 442 are joined such that their bottom surfaces face with each other, and the holding section 441 and the connection section 442 are coaxial with each other.

The flying body main body section 44 is configured of, for example, resin. The holding section 441 and the connection section 442 may be integrally formed, for example, as a resin molded article, or may be formed as separated components and then joined to each other. In the present embodiment, the flying body main body section 44 will be described as a component integrally molded with the holding section 441 and the connection section 442.

The holding section 441 houses and holds the gas generating device 45 in the interior. Specifically, the holding section 441 holds the gas generating device 45 in the interior of the ejection section 41 such that the gas discharge side of the gas generating device 45, that is, the gas discharge hole 456 (sealing member 452) side of the housing 451, faces the bottom portion 412 (bottom surface 412a) of the ejection section 41. For example, the holding section 441 includes a hole 441a formed so as to correspond to the shape of the gas generating device 45. For example, by press-fitting or adhering the gas generating device 45 (housing 451) to the hole 441a, the gas generating device 45 is held by the holding section 441.

The connection section 442 is formed so as to protrude to a side opposite to the holding section 441 in a direction parallel to the axis Q of the flying body main body section 44. As described above, the connection section 442 is formed in a tube shape having a bottom (for example, a cylindrical shape). The connection section 442 includes a locking section 4420 for locking the connection line 46 at an end portion at an opposite side to the holding section 441. The locking section 4420 is, for example, a through-hole. For example, the connection line 46 is locked to the locking section 4420 while being inserted through the through-hole as the locking section 4420.

In the flying body ejection mechanism 50 according to Embodiment 1, the lead wire 47 is led out in a different direction from the ejection direction (the axis Q direction) of ejecting the flying body main body section 44 from the internal space 440, with one end connected to the gas generating device 45.

Specifically, the lead wire 47 is led out in a direction opposite to the ejection direction of the flying body main body section 44, that is, in the S direction in FIG. 5. More specifically, as illustrated in FIG. 5, the lead wire 47 is led out to an exterior of the ejection section 41 through the through-hole 4520 formed at the sealing member 452 and the through-hole 4120 formed at the bottom portion 412 of the ejection section 41.

As illustrated in FIG. 5, the flying body 43 is disposed at the ejection section 41 such that the gas generating device 45 (sealing member 452) is spaced apart from and faces the bottom portion 412 (bottom surface 412a) of the ejection section 41 in the interior of the ejection section 41. This forms a space 418 between the gas generating device 45 of the flying body 43 and the bottom portion 412 of the ejection section 41.

It should be noted that a distance between the gas generating device 45 of the flying body 43 and the bottom portion 412 of the ejection section 41 can be changed as appropriate so that a pressure of gas for ejecting the flying body 43 is appropriate.

Next, a procedure of the opening of the parachute 400 in the parachute device 4 according to Embodiment 1 will now be described.

For example, during flying of the flight device 1 equipped with the parachute device 4, when a state with the inclination of the aircraft body (the aircraft body unit 2) of the flight device 1 exceeds the inclination threshold value 29 for a predetermined period of time because of strong wind, and the abnormality detection section 15, 15D determines that it is in the abnormal state, the fall control section 16 at the flight device 1 side or the fall control section 16D at the parachute device 4 side transmits a control signal indicating the opening of the parachute 400 to the ejection control section 42 of the parachute device 4.

The ejection control section 42 of the parachute device 4 outputs an ignition signal to the gas generating device 45 via the lead wire 47 when the control signal indicating the opening of the parachute 400 is received. Specifically, the ejection control section 42 causes a predetermined current to flow through the lead wire 47 to ignite the ignition agent 453 formed at one end of the lead wire 47.

Due to the ignition of the ignition agent 453, the gas generating agent 454 covering the ignition agent 453 chemically reacts to generate gas. As the pressure of the gas generated in the gas discharge chamber 455 increases, the sealing member 452 covering the gas discharge hole 456 is broken. This causes the gas in the gas discharge chamber 455 to be discharged from the gas discharge hole 456 into the space 418 in the ejection section 41, and the space 418 is filled with the gas. Then, when the pressure of the gas in the space 418 exceeds a predetermined value, the flying body 43 is moved toward the ejection port 413 side due to the pressure of the gas, and is ejected from the ejection port 413 of the ejection section 41.

At this time, the lead wire 47, together with the ignition agent 453, fixed to the gas generating agent 454 can be separated from the flying body 43 because the gas generating agent 454 chemically reacts. Thus, when the flying body 43 is ejected from the ejection section 41, for example, the lead wire 47 is separated from the flying body 43 and remains at the ejection section 41 side. Alternatively, the lead wire 47 is cut by the edge portion of the through-hole 4120 of the ejection section 41, a part of the lead wire 47 is ejected together with the flying body 43, and the remaining part of the lead wire 47 remains at the ejection section 41 side.

When the flying body 43 is ejected from each ejection section 41, each flying body 43 pulls the parachute 400 through the connection line 46. This causes the parachute 400 to be discharged from the parachute accommodation section 40. After that, as for the parachute 400 further pulled by the respective flying bodies 43, the parachute body 406 is opened by the air entering in the interior of the parachute body 406 in the folded state.

Figure 6:
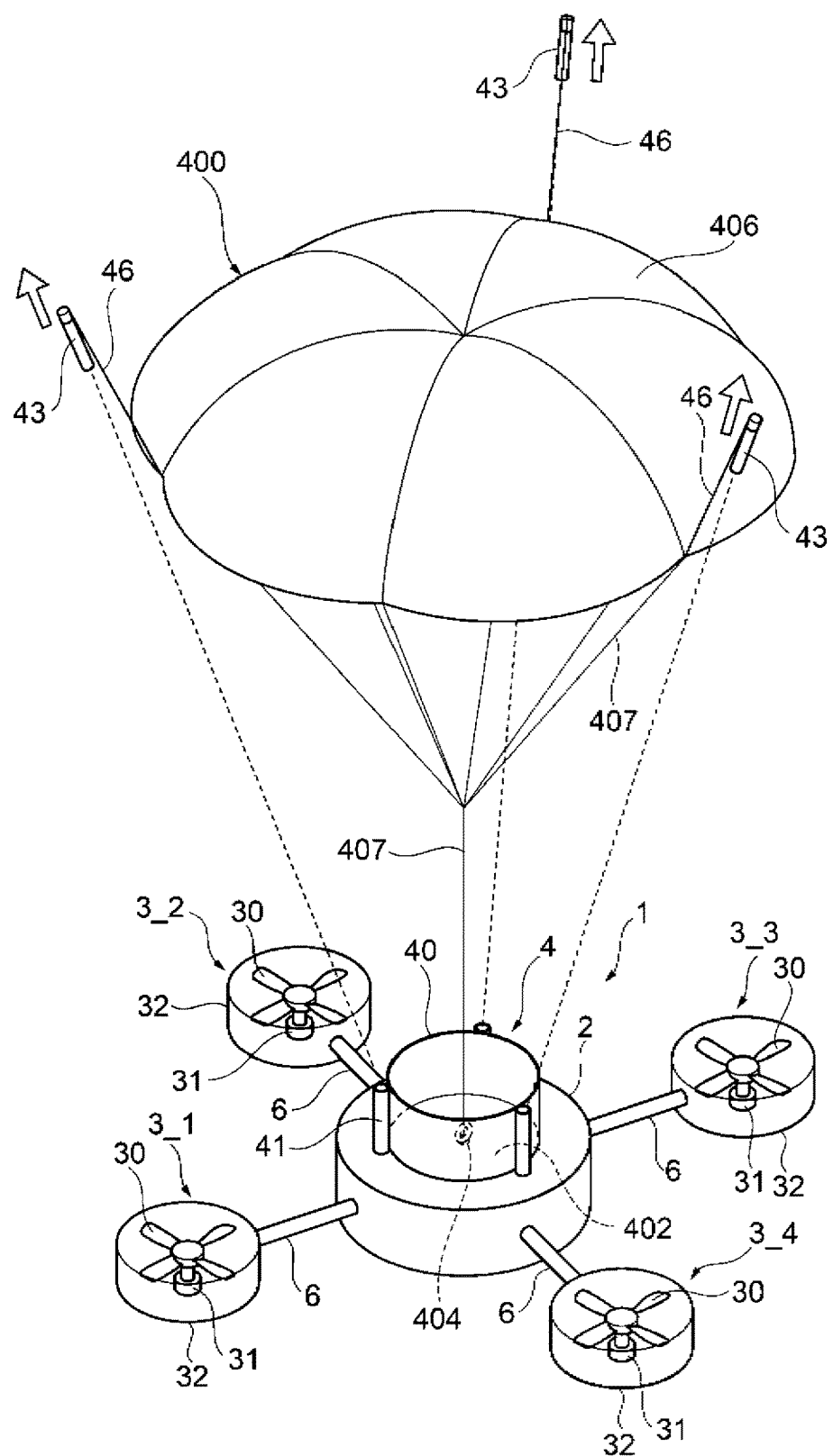
FIG. 6 is a diagram schematically illustrating a state with the parachute of the flight device equipped with the parachute device according to Embodiment 1 being open.

FIG. 6 is a diagram schematically illustrating a state with the parachute 400 of the flight device 1 according to Embodiment 1 being opened.

For example, when each flying body 43 is ejected through the processing procedure described above, each flying body 43 pulls the parachute body 406 of the discharged parachute 400 from its apex portion toward the edge (peripheral edge) side. This allows the parachute body 406 to be expanded and easily filled with the air, and thus, allows the parachute 400 to be immediately opened.

As described above, the parachute device 4 according to Embodiment 1 includes at least one flying body 43 connected to the parachute 400, and the flying body 43 includes the flying body main body section 44 engaged with the ejection section 41, and the gas generating device 45 disposed in the internal space 440 defined by the ejection section 41 and the flying body main body section 44.

Thus, as described above, since gas is generated from the gas generating device 45 to increase the pressure of the gas in the internal space 440 defined by the ejection section 41 and the flying body main body section 44, the flying body 43 can be made to fly from the ejection section 41. The flight of the flying body 43 allows the parachute body 406 of the parachute 400 connected to the flying body 43 to be pulled from its apex portion to the edge (peripheral edge) side, allowing the parachute body 406 to be more easily filled with the air and allowing the parachute 400 to be immediately opened. This makes it possible to increase the reliability of the parachute device 4.

In addition, in the parachute device 4, the lead wire 47 for igniting the gas generating device 45 is led out in a different direction from the ejection direction of the flying body 43 from the internal space 440, with one end connected to the gas generating device 45.

This allows the flying body 43 to be pulled and held in a different direction from its ejection direction by the lead wire 47 when the parachute device 4 is not in use. This allows the flying body 43 to be prevented from moving from an appropriate position or allows the flying body 43 to be prevented from falling out of the ejection section 41 even when the rotary wing aircraft equipped with the parachute device 4 is largely inclined or even when the rotary wing aircraft is turned upside down. This makes it possible to further increase the reliability of the parachute device 4.

Preferably, as described above, the lead wire 47 is led out in the direction S opposite to the ejection direction of the flying body 43. This makes it possible to more effectively prevent the flying body 43 from falling out of the ejection section 41 because the flying body 43 can be pulled from a more appropriate direction when the parachute device 4 is not in use.

Additionally, the lead wire 47 is led out to an exterior of the ejection section 41 through the through-hole 4120 formed at the bottom portion 412 of the ejection section 41. This facilitates assembly of the flying body ejection mechanism 50. For example, when the flying body ejection mechanism 50 is assembled, the other end of the lead wire 47 fixed at one end to the flying body 43 is first inserted through the through-hole 4120 formed at the bottom portion 412 of the ejection section 41. The flying body 43 is then inserted into the side wall portion 411 of the ejection section 41. This makes it possible to easily assemble the flying body ejection mechanism 50 in the state illustrated in FIG. 5.

Embodiment 2

Figure 7:
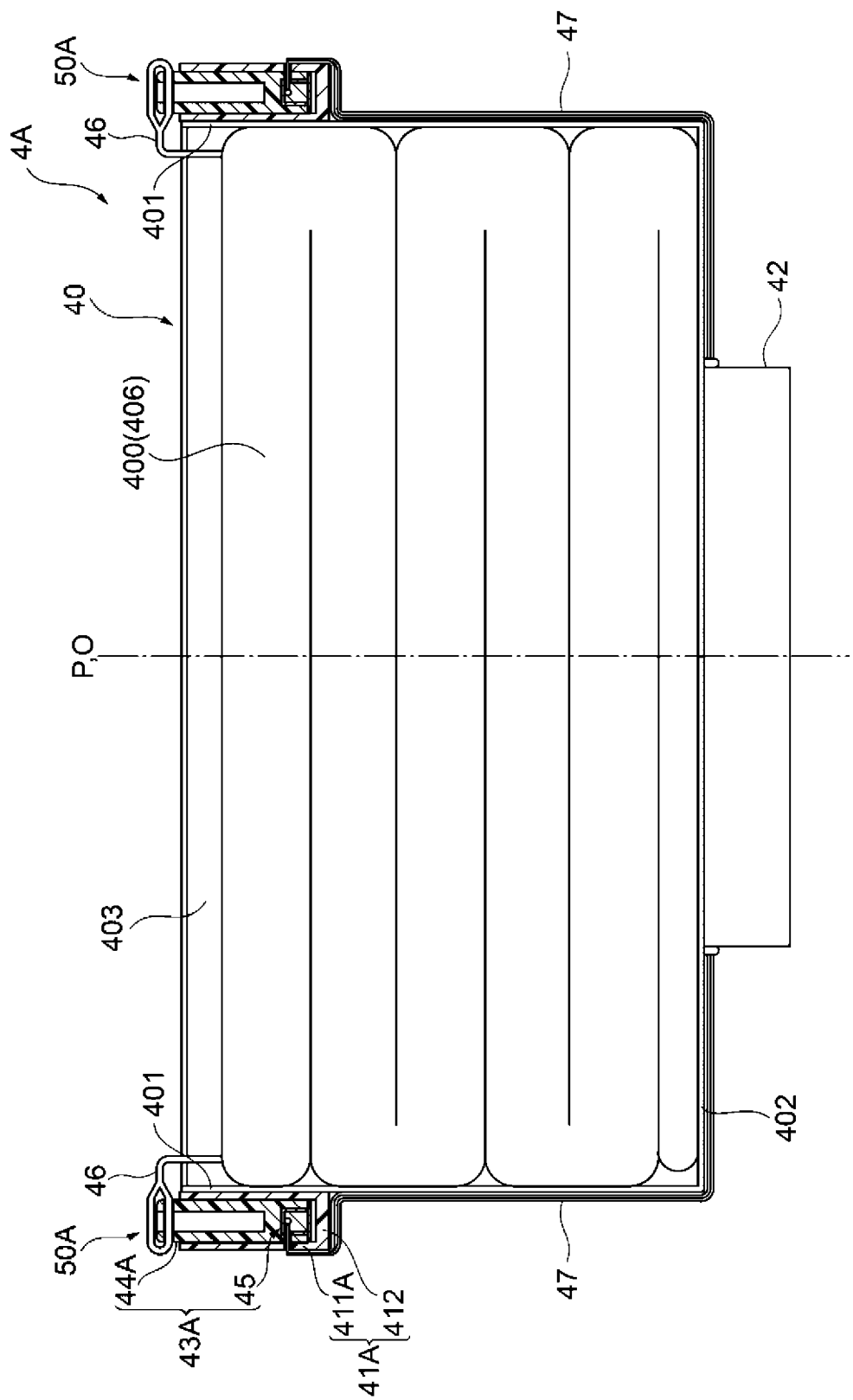
FIG. 7 is a diagram schematically illustrating a configuration of a parachute device according to Embodiment 2.

FIG. 7 is a diagram schematically illustrating a configuration of a parachute device 4A according to Embodiment 2. A side cross section of the parachute device 4A is illustrated in the same figure.

The parachute device 4A, illustrated in FIG. 7, according to Embodiment 2 differs from the parachute device 4 according to Embodiment 1 in that the lead wire 47 is led out from a side wall portion 411A of an ejection section 41A, and is similar to the parachute device 4 according to Embodiment 1 in other respects.

Figure 8:
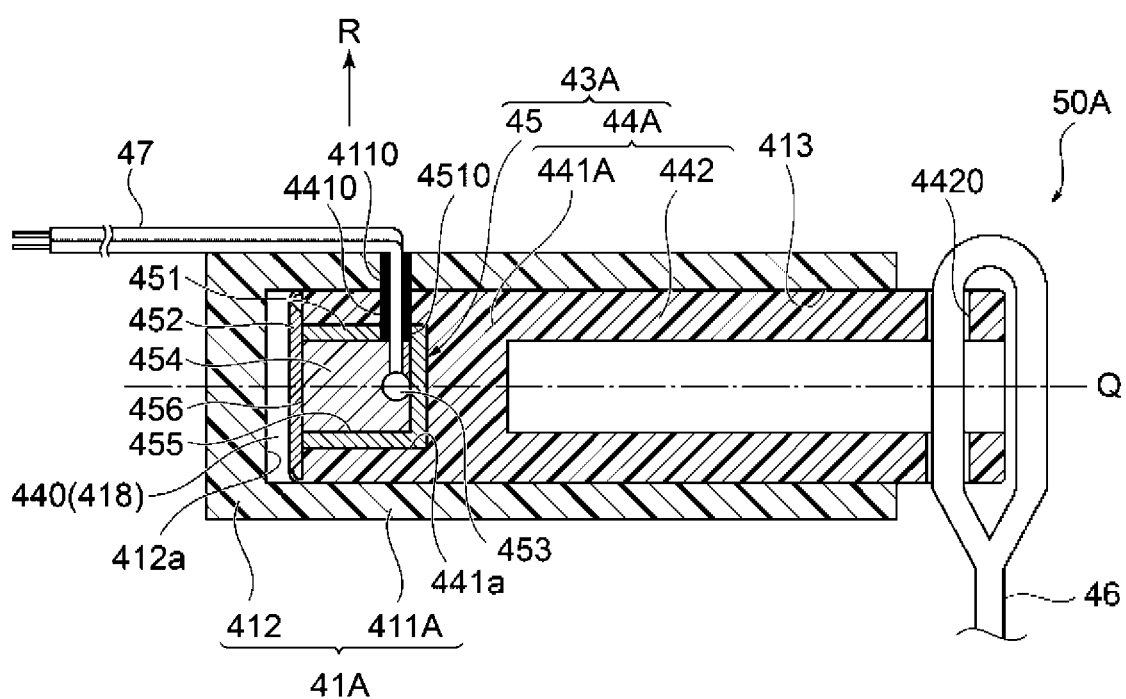
FIG. 8 is a diagram illustrating a configuration of a flying body ejection mechanism according to Embodiment 2.

FIG. 8 is a diagram illustrating a configuration of a flying body ejection mechanism 50A according to Embodiment 2.

The flying body ejection mechanism 50A includes a flying body 43A and the ejection section 41A.

In the flying body ejection mechanism 50A, the flying body main body section 44A is separated into two functional sections of a holding section 441A and the connection section 442, similarly to the flying body main body section 44 according to Embodiment 1. The holding section 441A corresponds to the holding section 441 according to Embodiment 1 and has similar functions to those of the holding section 441. A through-hole 4410 for passing the lead wire 47 is formed at the holding section 441A, as will be described below.

The ejection section 41A includes a side wall portion 411A and the bottom portion 412, similarly to the ejection section 41 according to Embodiment 1. The side wall portion 411A corresponds to the side wall portion 411 according to Embodiment 1 and has similar functions to those of the side wall portion 411. The through-hole 4110 for passing the lead wire 47 is formed at the side wall portion 411A, as will be described below.

The lead wire 47 is led out in a different direction from the ejection direction (the axis Q direction) of the flying body 43A from the internal space 440, with one end connected to the gas generating device 45.

Specifically, the lead wire 47 is led out in a direction intersecting with the ejection direction of the flying body 43. For example, the lead wire 47 is led out in the R direction orthogonal to the axis Q direction in FIG. 8.

The lead wire 47 is led out from the internal space 440 through the through-hole 4110 formed at the side wall portion 411A of the ejection section 41A to an exterior of the ejection section 41A. More specifically, as illustrated in FIG. 8, the lead wire 47 is led out to the exterior of the ejection section 41A through a through-hole 4510 formed at the housing 451 of the gas generating device 45, the through-hole 4410 formed at the holding section 441A of the flying body main body section 44A, and the through-hole 4110 formed at the side wall portion 411A of the ejection section 41A.

The lead wire 47 is configured to be disconnectable when the flying body 43A is ejected from the ejection port 413 of the ejection section 41A. For example, when the flying body 43A is ejected from the ejection port 413, the lead wire 47 is pulled by the flying body 43A, and its tensile force presses the lead wire 47 against the edge portion of the through-hole 4110, and the lead wire 47 is possible to be broken.

As described above, by leading out the lead wire 47 in the R direction orthogonal to the axis Q direction, the lead wire 47 is pressed against the edge portion of the through-hole 4110 by a larger force at the time of ejection of the flying body 43A, and the lead wire 47 is possible to be easily broken.

Preferably, the opening portion (edge portion) of the through-hole 4110 is processed in advance so as to have a sharp shape. This further allows the lead wire 47 to be easily broken.

As described above, the parachute device 4A according to Embodiment 2 is led out in a direction where the lead wire 47 for igniting the gas generating device 45 intersects the ejection direction of the flying body 43A (for example, the direction R in FIG. 8), and thus, the flying body 43A can be pulled in a different direction from the ejection direction by using the lead wire 47. Similarly to Embodiment 1, this allows the flying body 43A to be prevented from moving from an appropriate position or allows the flying body 43A to be prevented from falling out of the ejection section 41A when the parachute device 4A is not in use, and the reliability of the parachute device 4A to be increased.

Also, as described above, by leading out the lead wire 47 in the direction R orthogonal to the ejection direction of the flying body 43A, the flying body 43A is prevented from falling out of the ejection section 41A when the parachute device 4A is not in use, with the lead wire 47 being easily broken by applying an appropriate force to the lead wire 47 when the flying body 43A is ejected.

Embodiment 3

Figure 9:
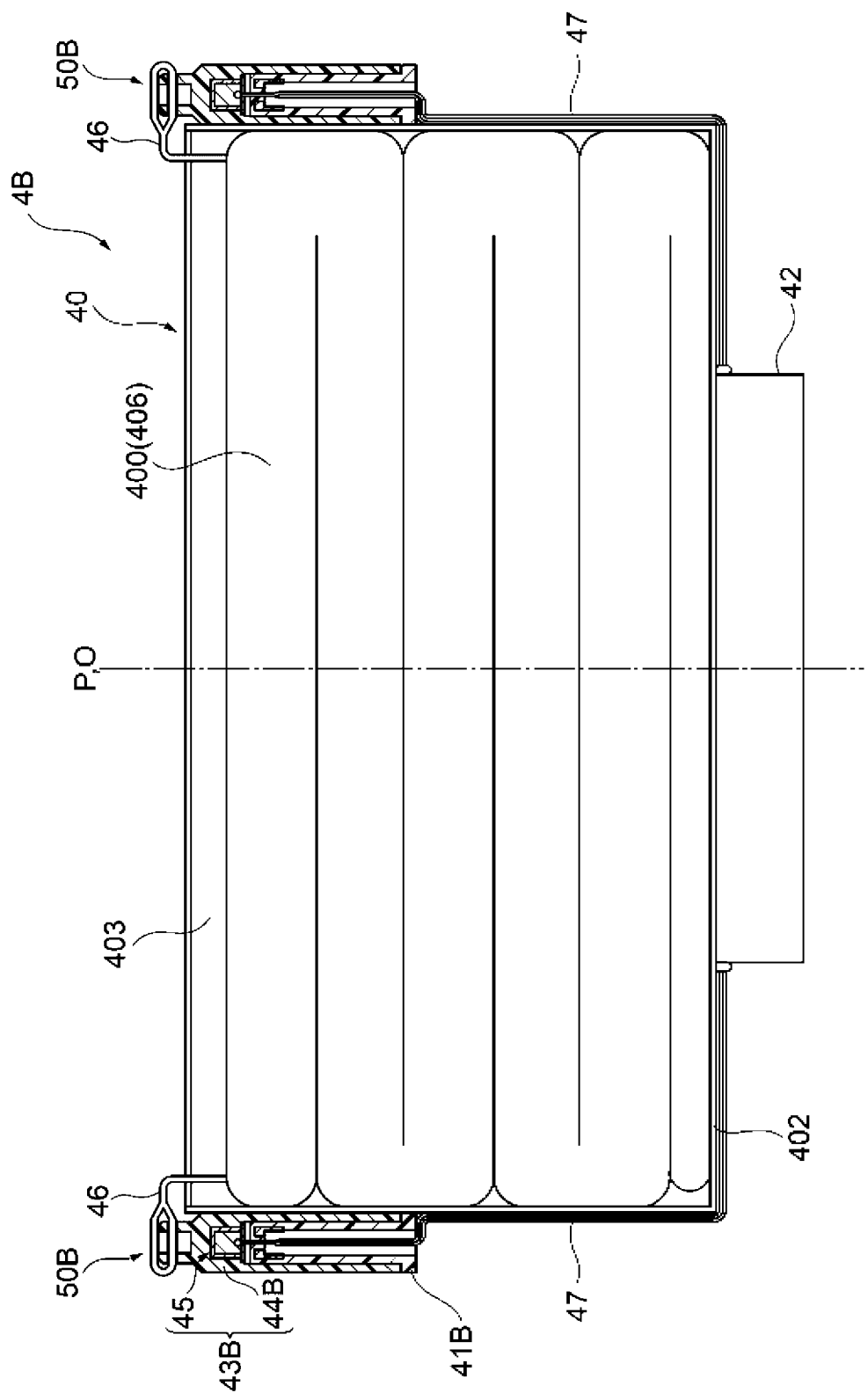
FIG. 9 is a diagram schematically illustrating a configuration of a parachute device according to Embodiment 3.

FIG. 9 is a diagram schematically illustrating a configuration of a parachute device 4B according to Embodiment 3. A side cross section of the parachute device 4B is illustrated in the same figure.

The parachute device 4B, illustrated in FIG. 9, according to Embodiment 3 differs from the parachute device 4 according to Embodiment 1 in the structures of the flying body and the ejection section, and is similar to the parachute device 4 according to Embodiment 1 in other respects.

Figure 10:
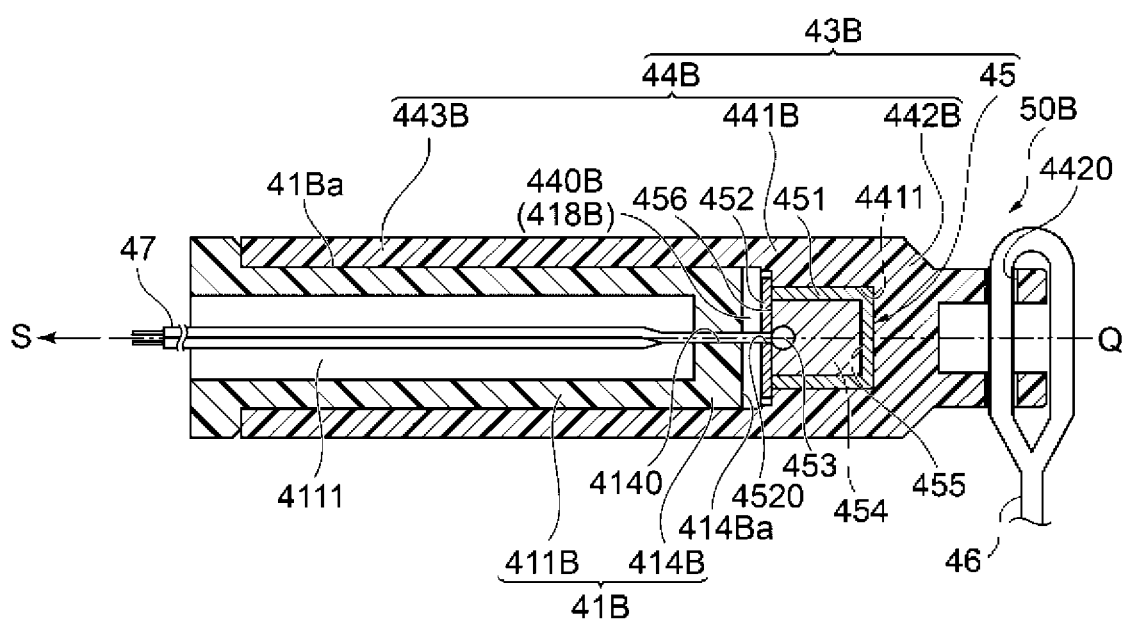
FIG. 10 is a diagram illustrating a configuration of a flying body ejection mechanism according to Embodiment 3.

FIG. 10 is a diagram illustrating a configuration of a flying body ejection mechanism 50B according to Embodiment 3.

The flying body ejection mechanism 50B includes a flying body 43B and an ejection section 41B.

The ejection section 41B is formed in a bar shape. Specifically, the ejection section 41B is formed, for example, in a tube shape having an opening at one end and having a bottom at the other end. More specifically, the ejection section 41B includes a side wall portion 411B having a tube shape (for example, a cylindrical shape) and a tip end portion 414B formed so as to cover one opening portion of the side wall portion 411B. The ejection section 41B is configured of resin, for example. The side wall portion 411B and the tip end portion 414B may be integrally formed, for example, as a resin molded article.

A through-hole 4140 configured to pass the lead wire 47 and communicating with an outer peripheral surface (tip end surface) 414Ba of the tip end portion 414B and an interior of the side wall portion 411B is formed at the tip end portion 414B.

The flying body 43B includes the gas generating device 45 and a flying body main body section 44B. The gas generating device 45 is provided in the interior of the flying body main body section 44B. The gas generating device 45 is disposed in an internal space 440B defined by the ejection section 41B and the flying body main body section 44B.

The flying body 43B is disposed on the ejection section 41B so as to cover at least a part of an outer peripheral surface of the ejection section 41B. Specifically, as illustrated in FIG. 10, the flying body 43B is supported on the ejection section 41B such that at least a part of the ejection section 41B is inserted in an interior of the flying body main body section 44B and the gas generating device 45 faces the tip end portion 414B of the ejection section 41B.

The flying body main body section 44B is formed in a tube shape (for example, a cylindrical shape) having an opening at one end and having a bottom at the other end. The flying body main body section 44B is configured of, for example, resin.

More specifically, the flying body main body section 44B is inserted through the ejection section 41B at the opening portion side, and holds the gas generating device 45 in the interior at the bottom portion side. Also, the flying body main body section 44B is connected to the connection line 46 at the end portion at the opposite side to the opening portion.

In other words, the flying body main body section 44B is divided into three functional sections of a supporting section 443B for supporting the flying body 43B at the ejection section 41B along the axis Q of the flying body main body section 44B, a holding section 441B for holding the gas generating device 45, and a connection section 442B for connecting with the connection line 46.

Here, the supporting section 443B, the holding section 441B, and the connection section 442B may be integrally formed, for example, as a resin molded article, or may be formed as separated components and joined to each other. In the present embodiment, the flying body main body section 44B will be described as a component integrally molded with the supporting section 443B, the holding section 441B, and the connection section 442B.

The supporting section 443B is formed in a tube shape (for example, a cylindrical shape). An inner diameter of the supporting section 443B has a size corresponding to an outer diameter of the ejection section 41B. At least a part of the ejection section 41B is inserted into the supporting section 443B from its one end side. Specifically, the tip end portion 414B of the ejection section 41B is inserted in the interior of the supporting section 443B from one end side of the supporting section 443B.

The holding section 441B includes, for example, a hole 4411 formed so as to correspond to the shape of the gas generating device 45. For example, by press-fitting or adhering the gas generating device 45 to the hole 4411, the holding section 441B holds the gas generating device 45.

The holding section 441B holds the gas generating device 45 at the other end side of the supporting section 443B with the gas generating section 45 facing the tip end portion 414B of the ejection section 41B. That is, the gas generating device 45 is disposed such that the gas discharge side of the gas generating device 45, that is, the gas discharge hole 456 (sealing member 452) side of the housing 451 faces the tip end portion 414B of the ejection section 41B.

As illustrated in FIG. 10, the flying body 43B is disposed at the ejection section 41B such that the gas generating device 45 (sealing member 452) is spaced apart from and faces the tip end portion 414B (tip end surface 414Ba) of the ejection section 41B. This forms a space 418B between the gas generating device 45 of the flying body 43B and the tip end portion 414B of the ejection section 41B.

Note that a distance between the gas generating device 45 of the flying body 43B and the tip end portion 414B of the ejection section 41B can be changed as appropriate so that the pressure of gas for ejecting the flying body 43B becomes appropriate.

The connection section 442B is formed so as to protrude from the holding section 441B toward a side opposite to the supporting section 443B in a direction parallel to the axis Q of the flying body main body section 44B. The connection section 442B is formed, for example, in a tube shape (for example, a cylindrical shape) having an opening at one end and having a bottom at the other end.

The connection section 442B is connected to the connection line 46. Specifically, the connection section 442B has the locking section 4420 for locking the connection line 46 at an end portion at an opposite side to the supporting section 443B. The locking section 4420 is, for example, a through-hole. For example, the connection line 46 is locked to the locking section 4420 while being inserted through the through-hole as the locking section 4420.

In the parachute device 4B according to Embodiment 3, the lead wire 47 extends in a direction opposite to the tip end portion 414B in the interior of the ejection section 41B.

More specifically, the lead wire 47 extends through the through-hole 4520 formed at the sealing member 452 and the through-hole 4140 formed at the tip end portion 414B of the ejection section 41B into an internal space 4111 of the side wall portion 411B of the ejection section 41B, and connects the gas generating device 45 and the ejection control section 42 to each other.

According to the parachute device 4B having the configuration described above, the gas generated from the gas generating device 45 is stored in a space defined by an inner wall surface of the supporting section 443B and the tip end surface 414Ba of the ejection section 41B to increase the gas pressure, and as a result, the flying body 43B can be vigorously ejected. At this time, a side surface 41Ba of the ejection section 41B functions as a guide mechanism configured to guide movement of the flying body 43B at the time of ejection, allowing the flying body 43B to more linearly fly.

Additionally, according to the parachute device 4B, the gas generating device 45 is sealed by the ejection section 41B with the gas generating device 45 accommodated in the interior of the flying body main body section 44B, and thus, it is possible for the gas generating device 45 to prevent degradation of the gas generating device 45 due to exposure to rainwater or foreign matter.

In particular, because the flying body main body section 44B is disposed so as to cover (so as to put on a lid over) the ejection section 41B having a bar shape, even when the flying body 43B is exposed to rain or wind when the parachute device 4B is disposed at the flight device 1, it is difficult for rainwater or foreign matter to enter in the interior of the flying body main body section 44B.

Further, in the parachute device 4B, the lead wire 47 extends in the direction S opposite to the tip end portion 414B of the ejection section 41B in the interior of the ejection section 41B. This allows the flying body 43B to be pulled in a different direction from its ejection direction by the lead wire 47. Similarly to Embodiment 1, this allows the flying body 43B to be prevented from moving from an appropriate position or allows the flying body 43B to be prevented from falling out of the ejection section 41B when the parachute device 4B is not in use, and the reliability of the parachute device 4B to be increased.

Also, in the parachute device 4B, the lead wire 47 is routed in the internal space 4111 of the ejection section 41B through the through-hole 4520 formed at the sealing member 452 and the through-hole 4140 formed at the tip end portion 414B of the ejection section 41B.

This facilitates assembly of the flying body ejection mechanism 50B. For example, when the flying body ejection mechanism 50B is assembled, first, the other end side of the lead wire 47 fixed to the flying body 43B at one end is inserted through the through-hole 4140 of the ejection section 41B. Then, the ejection section 41B is inserted in the interior of the supporting section 443B of the flying body 43B. Due to this, the flying body ejection mechanism 50B in the state illustrated in FIG. 10 can be easily assembled.

Embodiment 4

Figure 11:
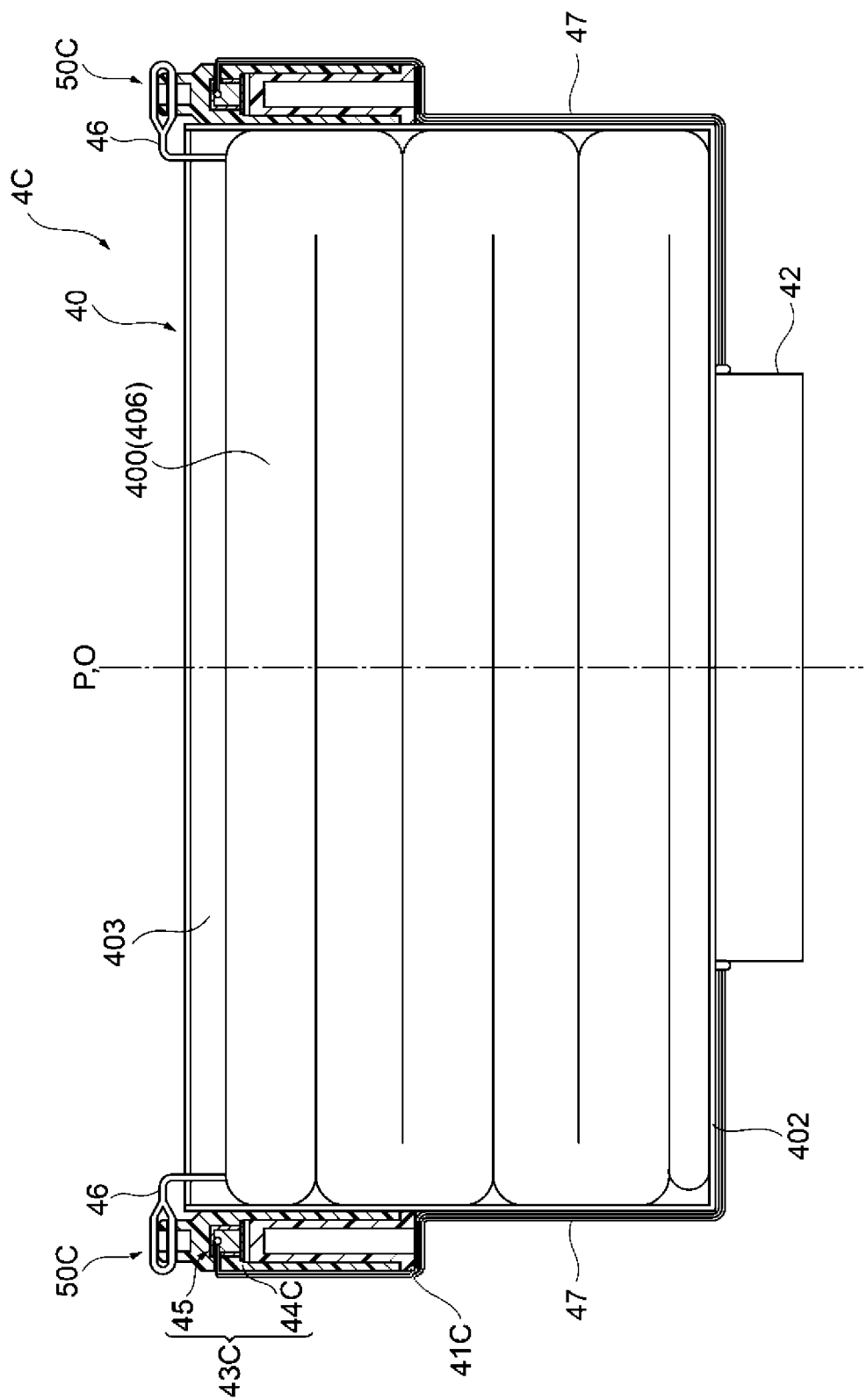
FIG. 11 is a diagram schematically illustrating a configuration of a parachute device according to Embodiment 4.

FIG. 11 is a diagram schematically illustrating a configuration of a parachute device 4C according to Embodiment 4. A side cross section of the parachute device 4C is illustrated in the same figure.

The parachute device 4C according to Embodiment 4, illustrated in FIG. 11, differs from the parachute device 4B according to Embodiment 3 in that the lead wire 47 is led out from a holding section 441C of a flying body main body section 44C, and is similar to the parachute device 4B according to Embodiment 3 in other respects.

Figure 12:
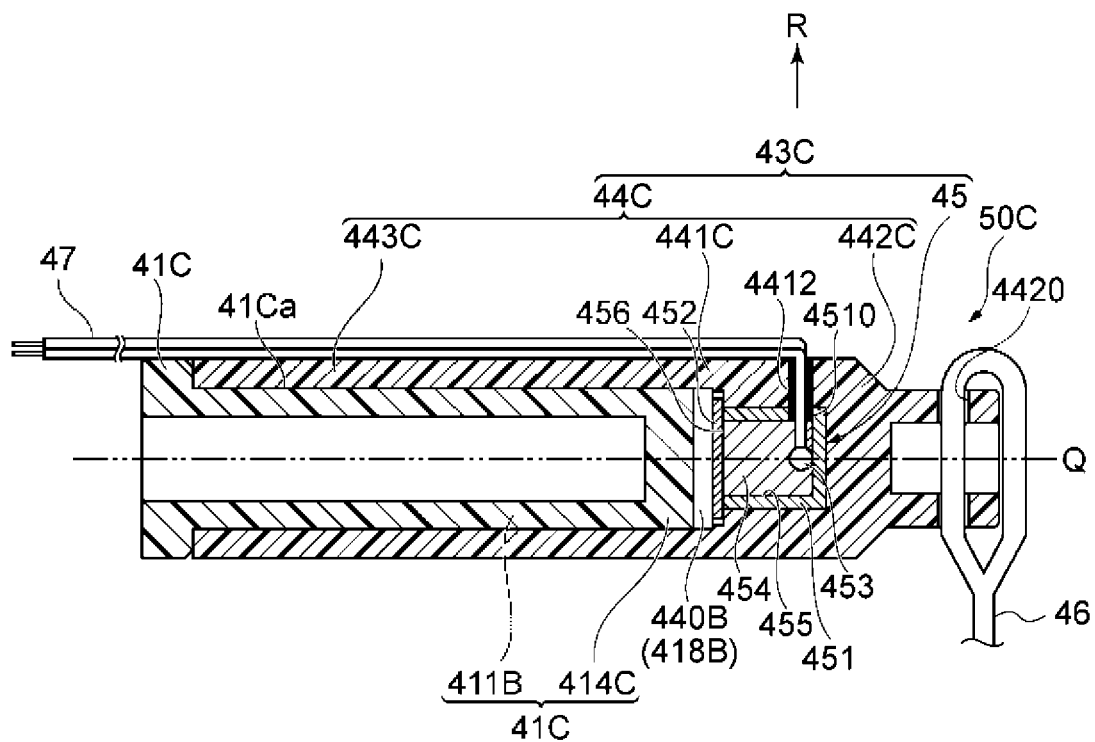
FIG. 12 is a diagram illustrating a configuration of a flying body ejection mechanism according to Embodiment 4.

FIG. 12 is a diagram illustrating a configuration of a flying body ejection mechanism 50C according to Embodiment 4.

The flying body ejection mechanism 50C includes the flying body 43C and the ejection section 41C.

The flying body main body section 44C of the flying body 43C is separated into three functional sections of a supporting section 443C, the holding section 441C, and a connection section 442C. The supporting section 443C, the holding section 441C, and the connection section 442C respectively correspond to the supporting section 443B, the holding section 441B, and the connection section 442B in the parachute device 4B according to Embodiment 3, and have similar functions to these sections.

In the flying body ejection mechanism 50C according to Embodiment 4, the lead wire 47 is led out in a different direction from the ejection direction of the flying body 43C (the axis Q direction) with one end connected to the gas generating device 45.

Specifically, the lead wire 47 is led out in a direction intersecting with the ejection direction of the flying body 43C. For example, the lead wire 47 is led out in the R direction orthogonal to the axis Q direction in FIG. 12.

The lead wire 47 is led out from the gas generating device 45 through a through-hole 4412 formed at the holding section 441C of the flying body main body section 44C to an exterior of the flying body main body section 44C. More specifically, as illustrated in FIG. 12, the lead wire 47 is led out to the exterior of the flying body main body section 44C through the through-hole 4510 formed at the housing 451 of the gas generating device 45 and the through-hole 4412 formed at the holding section 441C of the flying body main body section 44C.

The lead wire 47 is configured to be disconnectable when the flying body 43C is ejected from the ejection section 41C. For example, when the flying body 43C is ejected from the ejection section 41C, the flying body 43C is pulled by the lead wire 47, and its tensile force presses the lead wire 47 against the edge portion of the through-hole 4412 of the flying body main body section 44C, and the lead wire 47 can be broken.

As described above, by leading out the lead wire 47 in the R direction orthogonal to the axis Q direction, it is possible to apply a larger force to the lead wire 47 from the edge portion of the through-hole 4412 at the time of ejection of the flying body 43C, and the lead wire 47 is possible to be easily broken.

Here, it is preferable that the opening portion (edge portion) of the through-hole 4412 be processed in advance so as to have a sharp shape. This further allows the lead wire 47 to be easily broken.

As described above, in the parachute device 4C according to Embodiment 4, similar to the parachute device 4A according to Embodiment 2, the lead wire 47 for igniting the gas generating device 45 is led out in a direction (for example, the direction R in FIG. 12) intersecting with the ejection direction of the flying body 43C, and thus, the flying body 43C can be pulled by the lead wire 47 in a different direction from its ejection direction. Similarly to the parachute device 4A according to Embodiment 2, this allows the flying body 43C to be prevented from moving from an appropriate position or allows the flying body 43C to be prevented from falling out of the ejection section 41C when the parachute device 4C is not in use, and the reliability of the parachute device 4C to be increased.

Also, as described above, by leading out the lead wire 47 in the direction R orthogonal to the ejection direction of the flying body 43C, the flying body 43C is prevented from falling out of the ejection section 41C when the parachute device 4C is not in use, with it being possible to break the lead wire 47 by applying an appropriate force to the lead wire 47 when the flying body 43C is ejected.

Expansion of Embodiment

The invention conceived by the present inventors has been described in detail above with reference to the embodiments. However, the present invention is not limited to the embodiments, and of course, various modifications can be made without departing from the gist of the present invention.

For example, in the embodiments described above, the examples have been given that the ejection control section 42 is provided in the parachute device 4, 4A, 4B, 4C, but the present invention is not limited to this. For example, the ejection control section 42 may be provided in the aircraft body unit 2.

Figure 13:
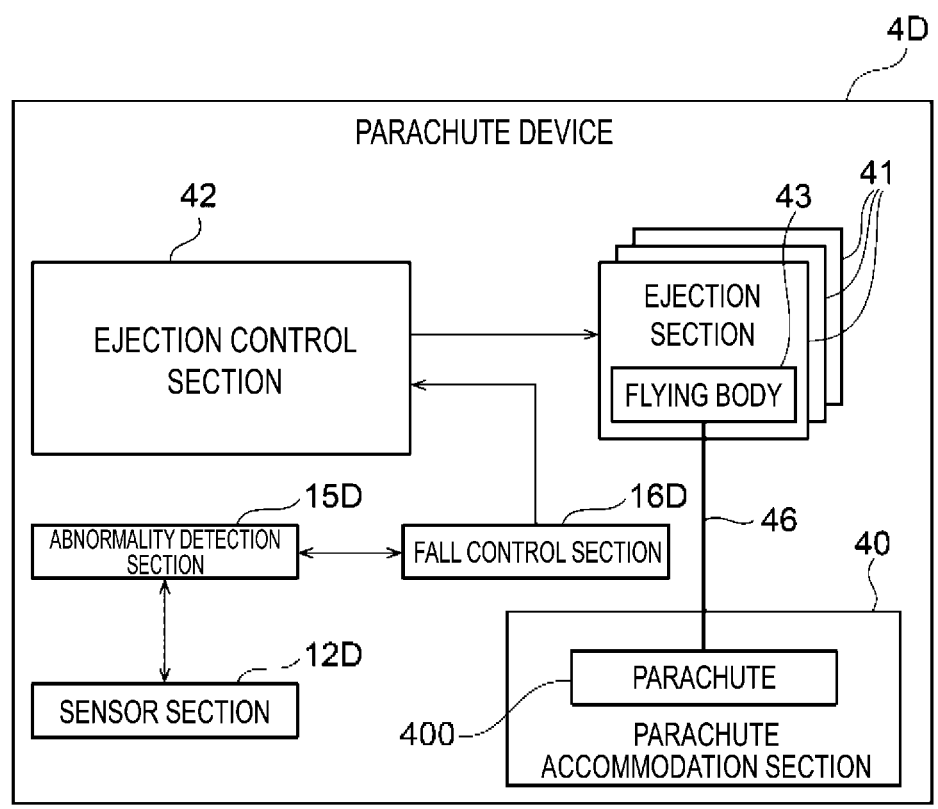
FIG. 13 is a functional block diagram of a parachute device including an abnormal state detection mechanism.

Furthermore, in the embodiments described above, the examples have been given where the parachute device 4, 4A to 4C ejects the flying body 43, 43A to 43C in response to a signal from the fall control section 16 provided at the aircraft body unit 2 side, but the present invention is not limited to this. For example, as illustrated in FIG. 13, a parachute device 4D may include a sensor section 12D including the angular velocity sensor 24, the acceleration sensor 25, the magnetic sensor 26, and the angle calculation section 27, and an abnormal state detection mechanism including an abnormality detection section 15D, and a fall control section 16D. Here, the angle calculation section 27, the abnormality detection section 15D, and the fall control section 16D of the sensor section 12D are achieved by program processing by, for example, a microcontroller. The sensor section 12D, the abnormality detection section 15D, and the fall control section 16D respectively have similar functions to those of the sensor section 12, the abnormality detection section 15, and the fall control section 16 described above. This allows the parachute device 4D itself to detect an abnormal state to eject the flying body 43.

In this case, the aircraft body unit 2 may or may not have an abnormal state detection mechanism including the sensor section 12, the abnormality detection section 15, and the fall control section 16. For example, both of the aircraft body unit 2 and the parachute device 4D have an abnormal state detection mechanism, and thus, even when one abnormal state detection mechanism cannot detect an abnormal state due to some causes, it is possible to detect the abnormal state by the other abnormal state detection mechanism to more reliably open the parachute 400.

In the embodiments described above, a case of the parachute accommodation section 40 having a cylindrical shape has been exemplified, but the present invention is not limited to this. That is, the parachute accommodation section 40 may have a space for accommodating the parachute 400 in the interior, and may be formed, for example, in a hollow polygonal column (for example, quadrangular prism) shape.

Furthermore, in Embodiment 1, the example has been given where the flying body 43 is disposed such that the space 418 is formed between the gas generating device 45 and the ejection section 41, but the present invention is not limited to this. That is, as long as sufficient gas pressure can be obtained in order to eject the flying body 43, the gas generating device 45 may be disposed in contact with the ejection section 41 (the bottom surface 412a). The same applies to the other embodiments.

In addition, in the embodiments described above, the examples have been given that the outer shape of the ejection section 41, 41A to 41C is cylindrical, but the present invention is not limited to this. That is, the ejection section 41, 41A may have a structure accommodating the flying body 43, 43A in the interior, and being capable of ejecting the flying body 43, 43A, for example, the outer shape may be a polygonal column (for example, quadrangular prism) shape, and the internal space accommodating the flying body 43, 43A may be cylindrical. Similarly, the ejection section 41B, 41C may have a structure where the flying body 43B, 43C is disposed outside and the flying body 43B, 43C can be ejected, and for example, the outer shape may be a polygonal column (for example, quadrangular prism) shape. However, in that case, the internal shape of the flying body 43B, 43C needs to be matched to the ejection section 41B, 41C.

Reference Signs List

1 Flight device
2 Aircraft body unit
3, 3_1 to 3_n Thrust force generation section
4, 4A to 4D Parachute device
5 Notification device
6 Arm section
9 External device
11 Power supply section
12, 12D Sensor section
13, 13_1 to 13_n Motor drive section
14 Flight control section
15, 15D Abnormality detection section
16, 16D Fall control section
17 Communication section
18 Storage section
22 Battery
23 Power supply circuit
24 Angular velocity sensor
25 Acceleration sensor
26 Magnetic sensor
27 Angle calculation section
28 Remaining capacity threshold value
29 Inclination threshold value
30 Propeller
31 Motor
32 Case
40 Parachute accommodation section
41, 41A, 41B, 41C Ejection section
41Ba, 41Ca Side surface
42 Ejection control section
43, 43A, 43B, 43C Flying body
44, 44A, 44B, 44C Flying body main body section
45 Gas generating device
46 Connection line
47 Lead wire (conductive wire)
50, 50A, 50B, 50C Flying body ejection mechanism
400 Parachute
401 Side wall portion
402 Bottom portion
403 Accommodation space
404 Parachute attachment section
406 Parachute body (canopy)
407 Hanging line
411, 411A, 411B Side wall portion
412 Bottom portion
412a Bottom surface
413 Ejection port
414B, 414C Tip end portion
414Ba Outer peripheral surface (tip end surface)
418, 418B Space 440, 440B Internal space
441, 441A, 441B, 441C Holding section
441a Hole
442, 442B, 442C Connection section
443B, 443C Supporting section
451 Housing
452 Sealing member
453 Ignition agent
454 Gas generating agent
455 Gas discharge chamber
456 Gas discharge hole
4110, 4120, 4140, 4410, 4412, 4510, 4520 Through-hole
4111 Internal space
4411 Hole
4420 Locking section (through-hole)

The invention claimed is:

1. A parachute device comprising:
a parachute;
a parachute accommodation section configured to accommodate the parachute;
at least one flying body including a flying body main body section connected to the parachute and a gas generating device configured to generate gas;
an ejection section configured to hold the flying body and to eject the flying body held; and
a lead wire configured to ignite the gas generating device, wherein
the flying body main body section is engaged with the ejection section,
the gas generating device is disposed in an internal space defined by the ejection section and the flying body main body section, and
the lead wire is led out from the internal space in a different direction from an ejection direction of the flying body in a state with one end of the lead wire connected to the gas generating device.

2. The parachute device according to claim 1, wherein the lead wire is led out in a direction opposite to the ejection direction.

3. The parachute device according to claim 2, wherein the ejection section includes a side wall portion having a tube shape, and a bottom portion covering one opening of the side wall portion,
the flying body main body section is formed in a bar shape,
the gas generating device is disposed at one end side of the flying body main body section,
the flying body is disposed at the ejection section such that the flying body main body section is inserted in an interior of the ejection section at the one end side and the gas generating device faces the bottom portion of the ejection section in the interior of the ejection section,
the bottom portion is formed with a through-hole, and
the lead wire is led out through the through-hole to an exterior of the ejection section.

4. The parachute device according to claim 2, wherein the ejection section is formed in a bar shape,
the flying body main body section includes,
a supporting section formed in a tube shape, and inserted with at least a part of the ejection section from one end side,
a holding section configured to hold the gas generating device at an other end side of the supporting section such that the gas generating device faces a tip end portion of the ejection section inserted into the supporting section, and
a connection section formed so as to protrude from the holding section to a side opposite to the supporting section, and connected to a connection line connecting the parachute and the flying body, and
the lead wire extends in a direction opposite to the tip end portion in an interior of the ejection section.

5. The parachute device according to claim 1, wherein the lead wire is led out in a direction intersecting with the ejection direction.

6. The parachute device according to claim 5, wherein the ejection section includes a side wall portion having a tube shape, and a bottom portion covering one opening of the side wall portion,
the flying body main body section is formed in a bar shape,
the gas generating device is disposed at one end side of the flying body main body section,
the flying body is disposed at the ejection section such that the flying body main body section is inserted in an interior of the ejection section at the one end side and the gas generating device faces the bottom portion of the ejection section in the interior of the ejection section,
the side wall portion is formed with a through-hole, and
the lead wire is led out through the through-hole to an exterior of the ejection section.

7. The parachute device according to claim 5, wherein the ejection section is formed in a bar shape,
the flying body main body section includes,
a supporting section formed in a tube shape, and inserted with at least a part of the ejection section from one end side,
a holding section configured to hold the gas generating device at an other end side of the supporting section such that the gas generating device faces a tip end portion of the ejection section inserted into the supporting section, and
a connection section formed so as to protrude from the holding section to a side opposite to the supporting section, and connected to a connection line connecting the parachute and the flying body,
the holding section is formed with a through-hole, and
the lead wire is led out through the through-hole to an exterior of the flying body main body section.

8. The parachute device according to claim 1, wherein the gas generating device includes
a housing,
a gas generating agent housed in the housing, and
an ignition agent formed at the one end of the lead wire and fixed in a state with at least a part of the ignition agent covered by the gas generating agent.

9. A flight device comprising:
an aircraft body unit;
a thrust force generation section comprising a propeller and a motor configured to rotate the propeller;
a parachute;
a parachute accommodation section configured to accommodate the parachute;
at least one flying body including a flying main body section connected to the parachute, and
a gas generating device configured to generate gas;
an ejection section configured to hold the flying body and eject the held flying body;
a lead wire configured to ignite the gas generating device;
a flight control section configured to control the thrust force generation section;

an abnormality detection section configured to detect an abnormality during flying; and a fall control section configured to cause the flying body to be ejected from the ejection section in response to detection of the abnormality, wherein:

the thrust force generation section is connected to the aircraft body unit, the thrust force generation section is configured to generate a thrust force, the flying body main body section is engaged with the ejection section, the gas generating device is disposed in an internal space defined by the ejection section and the flying body main body section, and the lead wire is led out from the internal space in a different direction from an ejection direction of the flying body in a state with one end of the lead wire connected to the gas generating device.

10. A flying body ejection mechanism comprising:

at least one flying body including a flying body main body section capable of being connected to a parachute, and a gas generating device configured to generate gas;

an ejection section configured to hold the flying body and to eject the flying body held; and a lead wire configured to ignite the gas generating device, wherein the flying body main body section is engaged with the ejection section, the gas generating device is disposed in an internal space defined by the ejection section and the flying body main body section, and the lead wire is led out from the internal space in a different direction from an ejection direction of the flying body in a state with one end of the lead wire connected to the gas generating device.

11. The flying body ejection mechanism according to claim 10, wherein the lead wire is led out in a direction opposite to the ejection direction.

12. The flying body ejection mechanism according to claim 11, wherein the ejection section includes a side wall portion having a tube shape, and a bottom portion covering one opening of the side wall portion, the flying body main body section is formed in a bar shape, the gas generating device is disposed at one end side of the flying body main body section, the flying body is disposed at the ejection section such that the flying body main body section is inserted in an interior of the ejection section at the one end side and the gas generating device faces the bottom portion of the ejection section in the interior of the ejection section, the bottom portion is formed with a through-hole, and the lead wire is led out through the through-hole to an exterior of the ejection section.

13. The flying body ejection mechanism according to claim 11, wherein the ejection section is formed in a bar shape, the flying body main body section includes, a supporting section formed in a tube shape, and inserted with at least a part of the ejection section from one end side, a holding section configured to hold the gas generating device at an other end side of the supporting section such that the gas generating device faces a tip end portion of the ejection section inserted into the supporting section, and a connection section formed so as to protrude from the holding section to a side opposite to the supporting section, and connected to a connection line connecting the parachute and the flying body, and the lead wire extends in a direction opposite to the tip end portion in an interior of the ejection section.

14. The flying body ejection mechanism according to claim 10, wherein the lead wire is led out in a direction intersecting with the ejection direction.

15. The flying body ejection mechanism according to claim 14, wherein the ejection section includes a side wall portion having a tube shape, and a bottom portion covering one opening of the side wall portion, the flying body main body section is formed in a bar shape, the gas generating device is disposed at one end side of the flying body main body section, the flying body is disposed at the ejection section such that the flying body main body section is inserted in an interior of the ejection section at the one end side and the gas generating device faces the bottom portion of the ejection section in the interior of the ejection section, the side wall portion is formed with a through-hole, and the lead wire is led out through the through-hole to an exterior of the ejection section.

16. The flying body ejection mechanism according to claim 14, wherein the ejection section is formed in a bar shape, the flying body main body section includes, a supporting section formed in a tube shape, and inserted with at least a part of the ejection section from one end side, a holding section configured to hold the gas generating device at an other end side of the supporting section such that the gas generating device faces a tip end portion of the ejection section inserted into the supporting section, and a connection section formed so as to protrude from the holding section to a side opposite to the supporting section, and connected to a connection line connecting the parachute and the flying body, the holding section is formed with a through-hole, and the lead wire is led out through the through-hole to an exterior of the flying body main body section.

* * * * *